United States Patent
Hato

(10) Patent No.: US 11,386,585 B2
(45) Date of Patent: Jul. 12, 2022

(54) DRIVING SUPPORT DEVICE, DRIVING SUPPORT METHOD, AND STORAGE MEDIUM STORING DRIVING SUPPORT PROGRAM

(71) Applicant: Mitsubishi Electric Corporation, Tokyo (JP)

(72) Inventor: Jumpei Hato, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 106 days.

(21) Appl. No.: 17/012,804

(22) Filed: Sep. 4, 2020

(65) Prior Publication Data
US 2020/0402267 A1 Dec. 24, 2020

Related U.S. Application Data

(63) Continuation of application No. PCT/JP2018/009410, filed on Mar. 12, 2018.

(51) Int. Cl.
*G06T 11/00* (2006.01)
*G09G 5/37* (2006.01)
(Continued)

(52) U.S. Cl.
CPC .............. *G06T 11/00* (2013.01); *B60K 35/00* (2013.01); *B60Q 9/008* (2013.01); *G06V 20/56* (2022.01);
(Continued)

(58) Field of Classification Search
None
See application file for complete search history.

(56) References Cited

U.S. PATENT DOCUMENTS 8,947,219 B2 * 2/2015 Popovic ................. G08G 1/166
340/436
2014/0092134 A1 4/2014 Nagasawa et al.
2019/0325754 A1* 10/2019 Aoude ............. G08G 1/096716

FOREIGN PATENT DOCUMENTS

DE   10 2013 110 332 A1   6/2014
JP        7-61257 A         3/1995
(Continued)

OTHER PUBLICATIONS

Arita et al., Machine translated WO2017013739A "Display Control Apparatus, Display Apparatus, and Displayy control method", Jan. 26, 2017 (Year: 2017) (Year: 2017).*
(Continued)

Primary Examiner — Saptarshi Mazumder
(74) Attorney, Agent, or Firm — Birch, Stewart, Kolasch & Birch, LLP

(57) ABSTRACT

A driving support device includes processing circuitry to judge a target object that is a real object existing in the vicinity of the vehicle and should be paid attention to by the driver; to generate a visual attraction stimulation image that appears to move from a position farther than the target object towards a position where the target object exists; to cause a display device to display the visual attraction stimulation image; and to receive body information from a body information detector acquiring the body information on the driver, to calculate a value indicating body reaction to visual stimulation sensed by the driver, and to correct a display parameter that determines display condition of the visual attraction stimulation image based on the value indicating the body reaction so as to change a degree of the visual stimulation given to the driver by the visual attraction stimulation image.

12 Claims, 19 Drawing Sheets

(51) Int. Cl.
*B60K 35/00* (2006.01)
*B60Q 9/00* (2006.01)
*G08G 1/16* (2006.01)
*G06V 20/56* (2022.01)

(52) U.S. Cl.
CPC ............... *G08G 1/167* (2013.01); *G09G 5/37* (2013.01); *B60K 2370/149* (2019.05); *B60K 2370/152* (2019.05); *B60K 2370/178* (2019.05); *G09G 2354/00* (2013.01); *G09G 2380/10* (2013.01)

(56) References Cited

FOREIGN PATENT DOCUMENTS

| | | |
|---|---|---|
| JP | 2013-203103 A | 10/2013 |
| JP | 2014-99105 A | 5/2014 |
| WO | WO 2017/013739 A1 | 1/2017 |

OTHER PUBLICATIONS

Kondo et al., Machine translated Japanese Patent JP-2017-187955 "Line of Sight Guiding Device", Published 20171012 (Year: 2017).*
Office Action dated May 7, 2021 in counterpart German Patent Application No. 112018007056.5 with an English Translation.

* cited by examiner

TIME T0

INITIAL VISUAL ATTRACTION STIMULATION FRAME $T - T0 < T1$ $T - T0 = T1$ $T1 + T2 \leqq T - T0$ $T1 < T - T0 < T1 + T2$

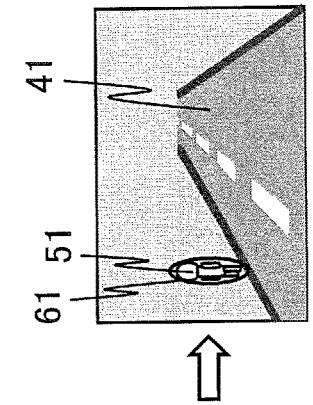
FIG. 15C
T − T0 = T1
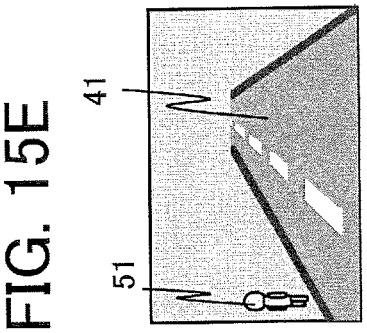
FIG. 15E
T1 + T2 ≦ T − T0
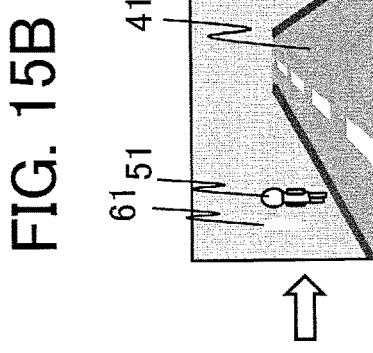
FIG. 15B
T − T0 < T1
FIG. 15D
T1 < T − T0 < T1 + T2
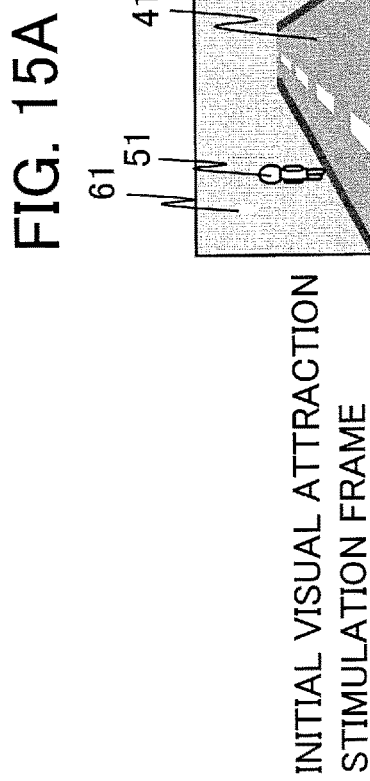
FIG. 15A
TIME T0
INITIAL VISUAL ATTRACTION STIMULATION FRAME

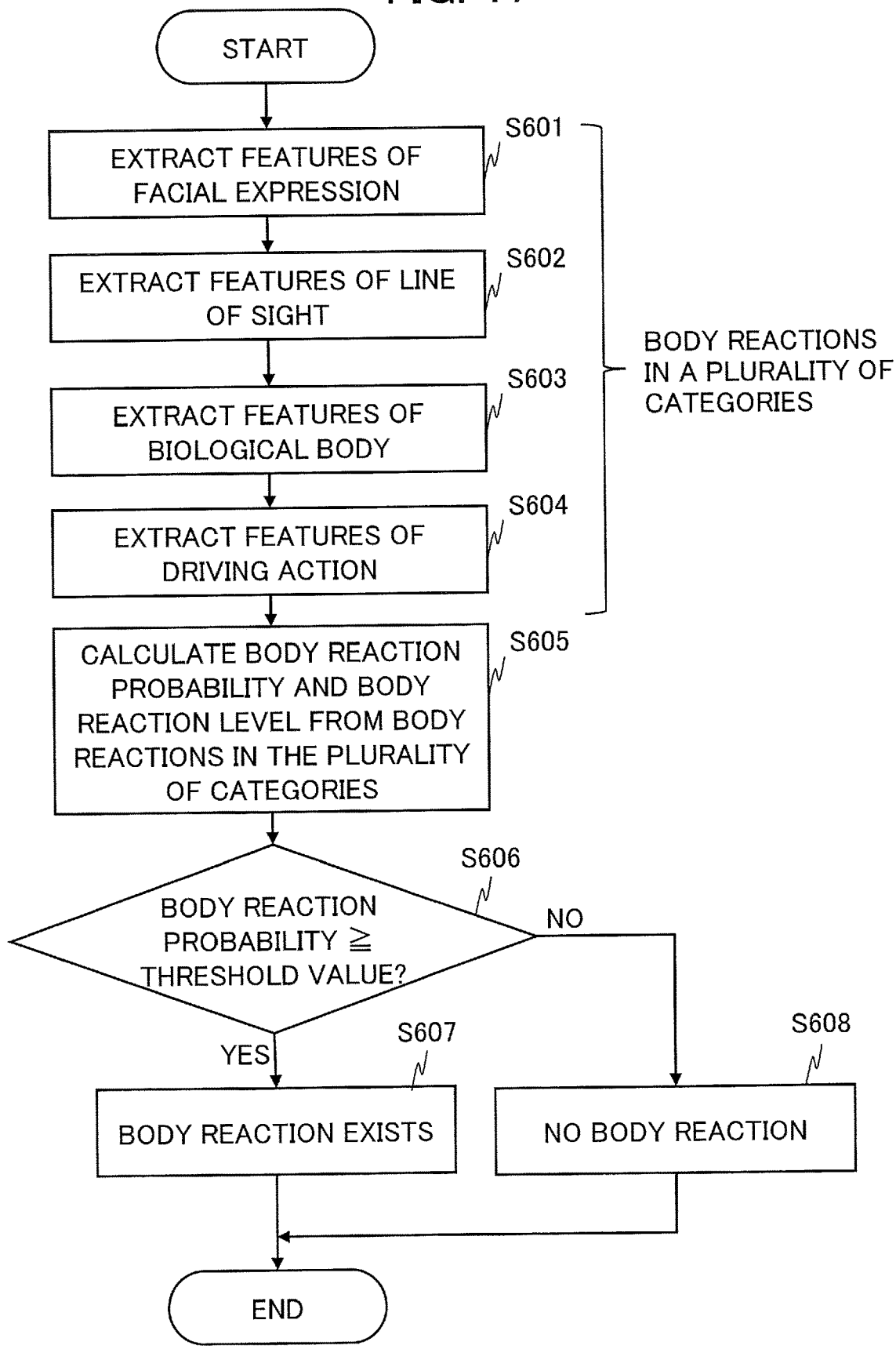

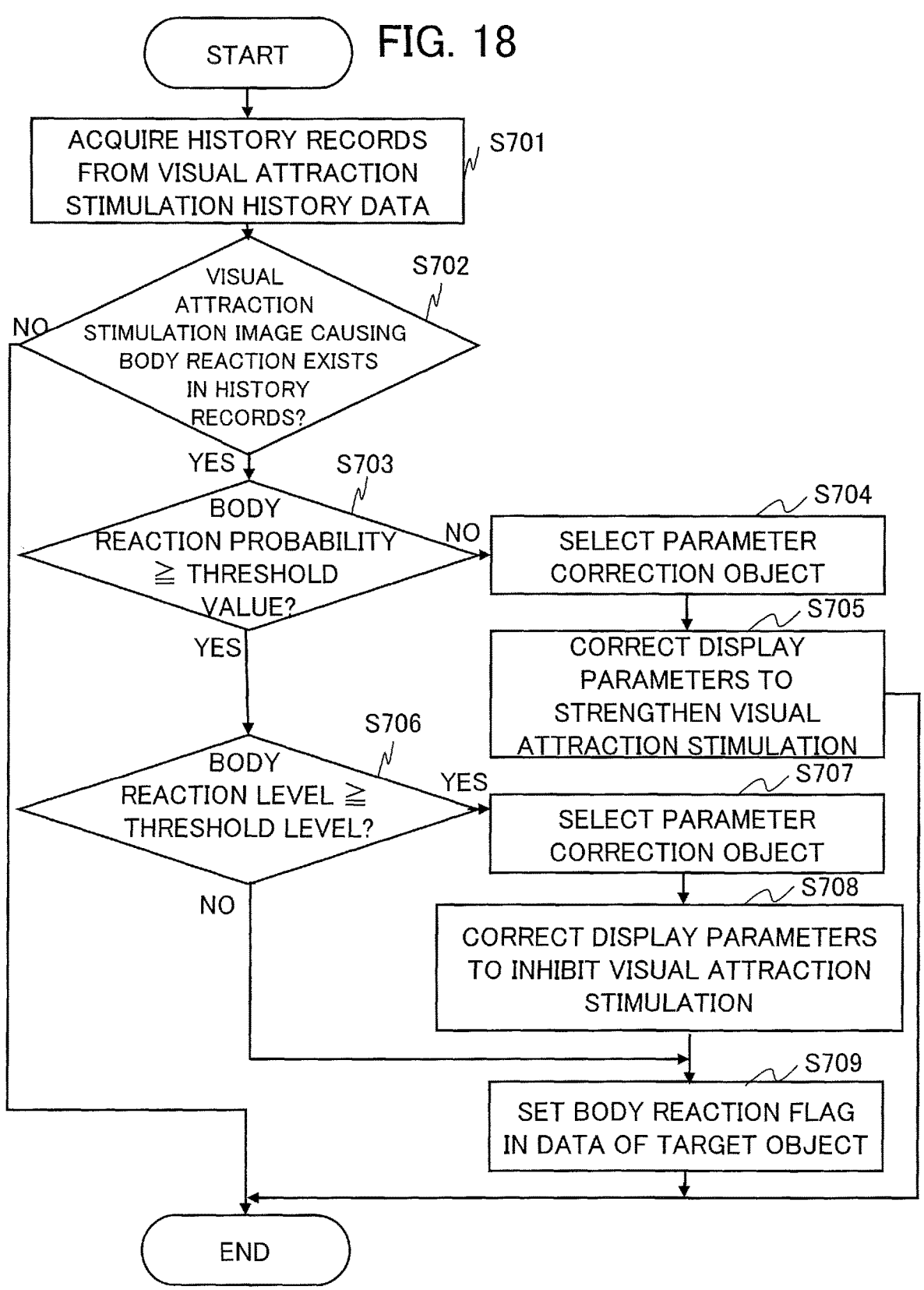

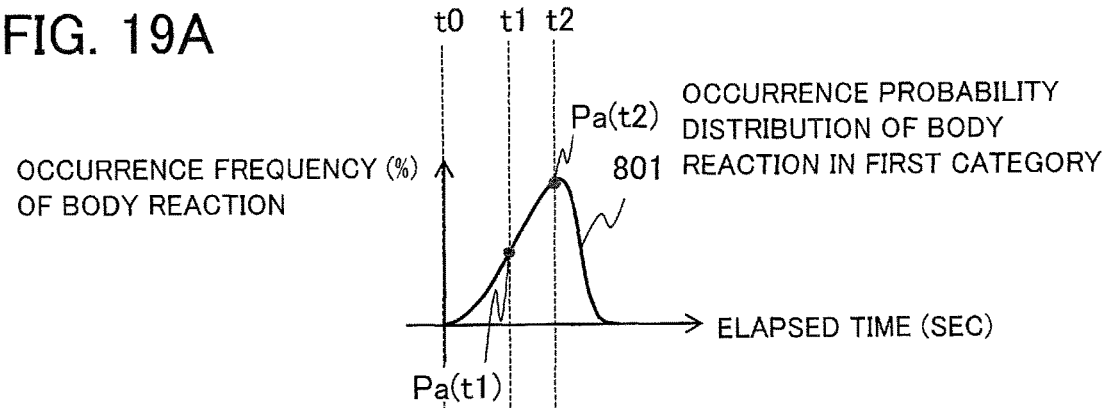
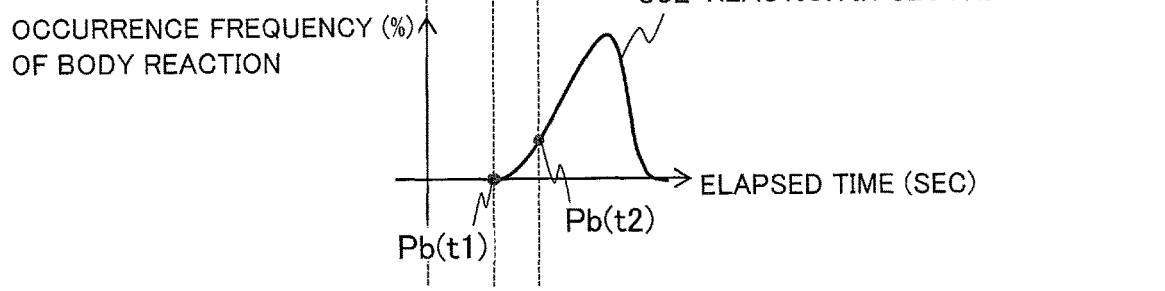
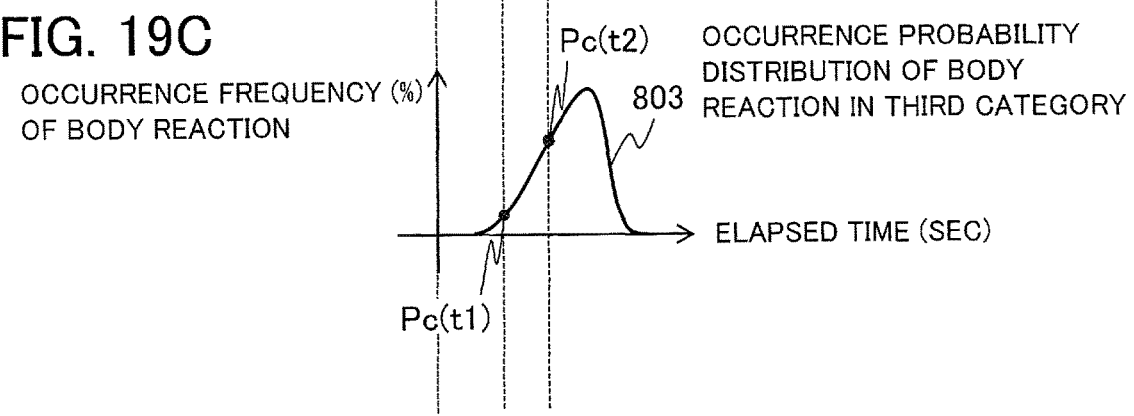
START OF DISPLAYING VISUAL ATTRACTION STIMULATION IMAGE

TIME T0

INITIAL VISUAL ATTRACTION STIMULATION FRAME $T - T0 < T1$ $T - T0 = T1$ $T1 < T - T0 < T1 + T2$ $T1 + T2 \leqq T - T0$

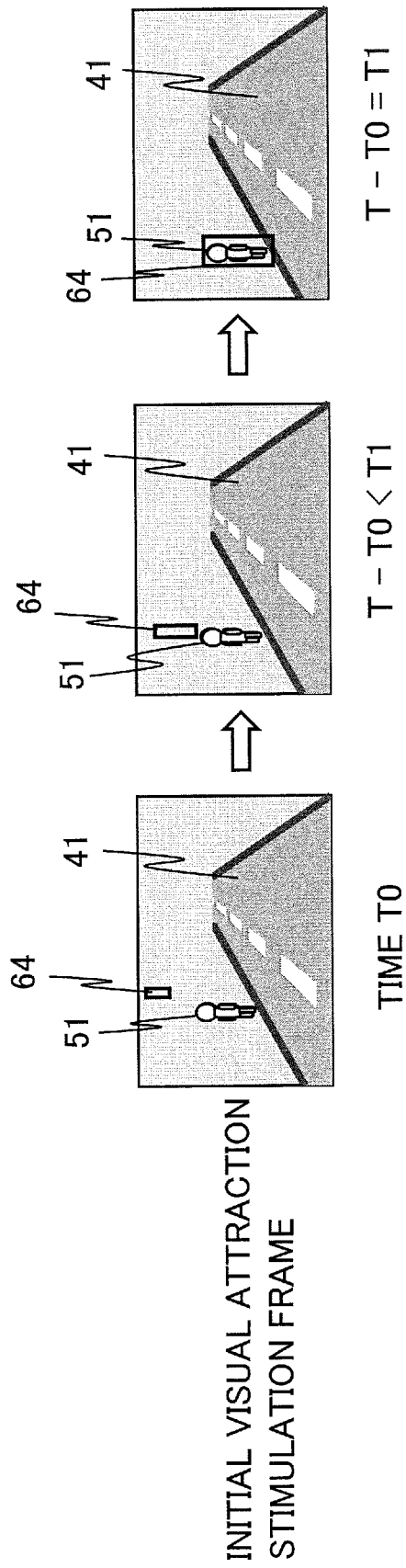
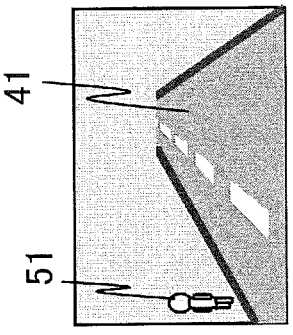
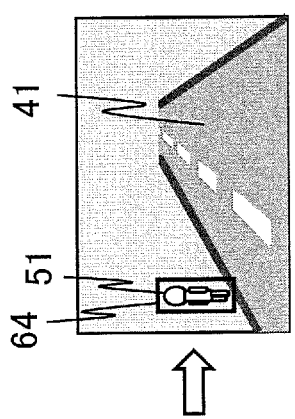

DRIVING SUPPORT DEVICE, DRIVING SUPPORT METHOD, AND STORAGE MEDIUM STORING DRIVING SUPPORT PROGRAM

CROSS-REFERENCE TO RELATED APPLICATION

This application is a continuation application of International Application No. PCT/JP2018/009410 having an international filing date of Mar. 12, 2018.

BACKGROUND OF THE INVENTION

1. Field of the Invention

The present invention relates to a driving support device, a driving support method and a storage medium storing a driving support program for presenting a driver of a vehicle with a visual attraction stimulation image that appears to move from a position farther than a target object existing in the vicinity of the vehicle towards the position of the target object.

2. Description of the Related Art

There has been proposed a device that explicitly guides the line of sight of a driver of a vehicle to a target object as an obstacle existing in the vicinity of the vehicle by displaying an enhanced image in superimposition on the target object depending on the driver's awareness level (see Patent Reference 1, for example).

There has also been proposed a device that carries out the sight line guidance without making a driver of a vehicle be conscious of the sight line guidance by guiding the driver's line of sight by use of a stimulus (e.g., luminance image) that is hardly distinguishable from a visual attraction target object existing in the vicinity of the vehicle (see Patent Reference 2, for example).

Incidentally, in the present application, "visual attraction" means attracting a person's line of sight. Further, "visual attractiveness" means the degree of attracting attention of a person, which is referred to also as attention-drawing quality. Furthermore, "visual attractiveness is high" means that the ability to attract a person's line of sight is high, which is referred to also as "conspicuous".

Patent Reference 1: Japanese Patent Application Publication No. 7-061257 (paragraphs 0004 to 0008, for example)

Patent Reference 2: Japanese Patent Application Publication No. 2014-099105 (paragraphs 0039 and 0058, for example)

With the device described in the Patent Reference 1, the enhanced image is displayed in superimposition on the target object that is a real object, and thus the driver strongly recognizes the fact that the driver underwent the sight line guidance, and consequently, a situation in which the driver is overconfident in the driver's own attentiveness is unlikely to occur. However, continuous use of this device is accompanied by the danger that the driver loses consciousness trying to perceive the target object with the driver's own attentiveness.

With the device described in the Patent Reference 2, the luminance image is displayed in superimposition on the visual attraction target object, and thus there is the danger that the driver loses the consciousness trying to perceive the target object with the driver's own attentiveness. Further, since the driver's line of sight is guided by using the luminance image hardly distinguishable from the visual attraction target object, there tends to occur a situation in which the driver recognizes that the driver perceived the target object with the driver's own attentiveness alone (i.e., the driver erroneously assumes that the driver perceived the target object with the driver's own attentiveness alone) and the driver becomes overconfident in the driver's own attentiveness. As the driver becomes overconfident in the driver's own attentiveness, the driver's consciousness trying to perceive the target object with the driver's own attentiveness lowers.

Further, there are cases where the image used for the sight line guidance in the Patent Reference 1 or 2 is incapable of providing the driver with visual stimulation of appropriate intensity.

SUMMARY OF THE INVENTION

An object of the present invention, which has been made to resolve the above-described problems, is to provide a driving support device, a driving support method and a driving support program capable of guiding the line of sight of the driver of a vehicle to a target object by giving stimulation of appropriate intensity to the driver by use of a visual attraction stimulation image and capable of preventing the lowering of the driver's consciousness trying to perceive the target object with the driver's own attentiveness.

A driving support device according to the present invention is a device for supporting driving performed by a driver of a vehicle, including a target object judgment unit that judges a target object that is a real object existing in a vicinity of the vehicle and should be paid attention to by the driver based on vicinity information acquired by a vicinity detection unit that captures an image of or detects a real object existing in the vicinity of the vehicle, a visual attraction stimulation image generation unit that generates a visual attraction stimulation image that appears to move from a position farther than the target object towards a position where the target object exists, a display control unit that causes a display device that displays an image in superimposition on the real object to display the visual attraction stimulation image, and a correction unit that receives body information from a body information acquisition unit acquiring the body information on the driver, calculates a value indicating body reaction to visual stimulation sensed by the driver from the body information, and corrects a display parameter that determines display condition of the visual attraction stimulation image based on the value indicating the body reaction so as to change a degree of the visual stimulation given to the driver by the visual attraction stimulation image.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 15A to 15E are diagrams showing another example of the visual attraction stimulation images displayed by the driving support device according to the embodiment;

FIG. 17 is a flowchart showing the operation of a body reaction measurement unit of the driving support device according to the embodiment;

FIG. 18 is a flowchart showing the operation of a visual attraction stimulation parameter correction unit of the driving support device according to the embodiment;

FIGS. 19A to 19C are explanatory diagrams showing a process of judging a visual attraction stimulation image having a possibility of causing body reaction by using an occurrence probability distribution of body reaction in regard to body data in each of a first category, a second category and a third category;

FIGS. 22A to 22E are diagrams showing another example of the visual attraction stimulation image displayed by the driving support device according to the embodiment.

DETAILED DESCRIPTION OF THE INVENTION

A driving support device, a driving support method and a driving support program according to an embodiment of the present invention will be described below with reference to the accompanying drawings. The following embodiment is just an example and a variety of modifications are possible within the scope of the present invention.

(1) Configuration

Figure 1:
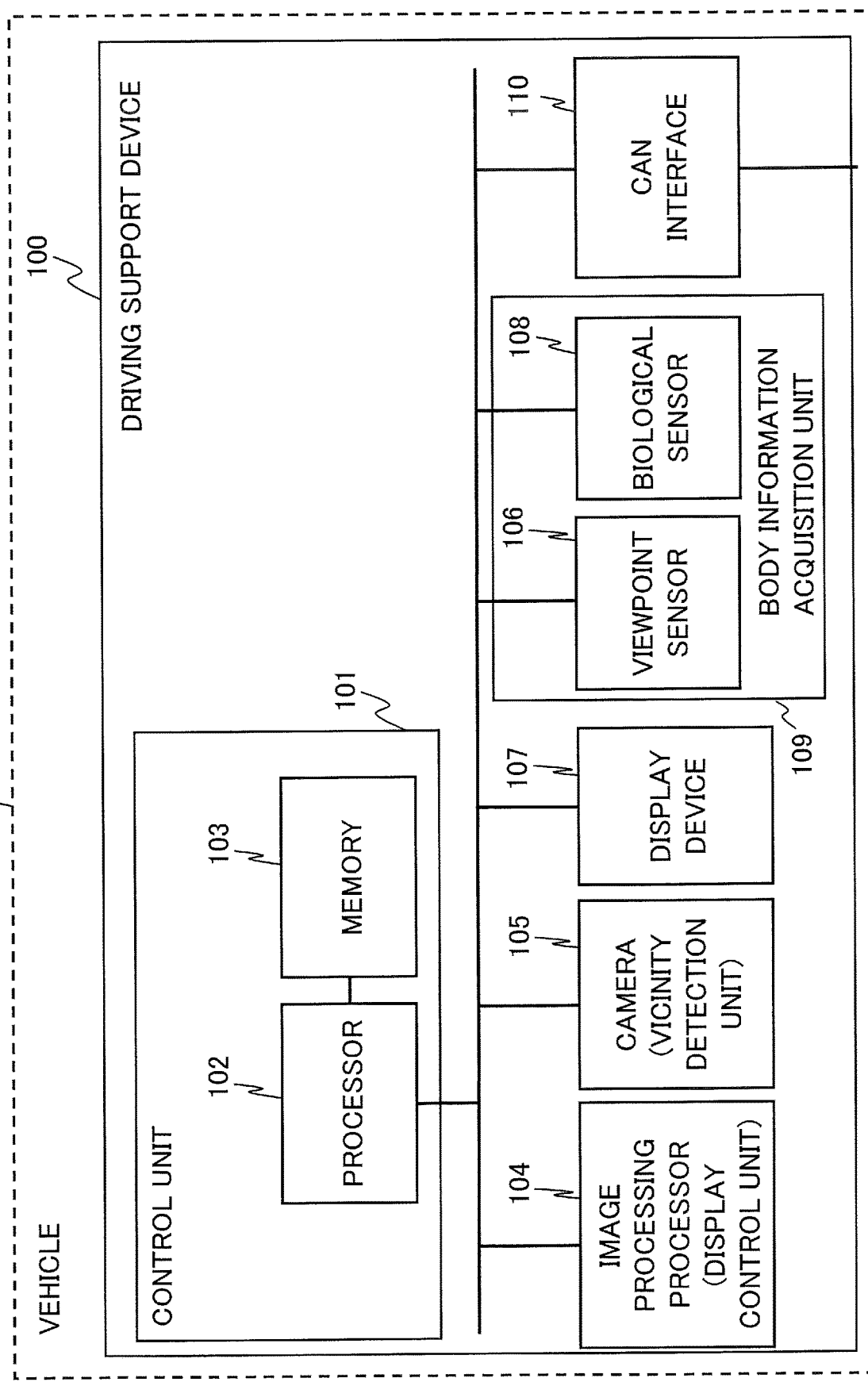
FIG. 1 is a diagram showing a hardware configuration of a driving support device according to an embodiment of the present invention.

FIG. 1 is a diagram showing a hardware configuration of a driving support device 100 according to an embodiment of the present invention. The driving support device 100 is a device capable of executing a driving support method according to the embodiment. As shown in FIG. 1, the driving support device 100 includes a control unit 101. The driving support device 100 is a device that visually presents a visual attraction stimulation image, for guiding the line of sight of the driver of a vehicle 10 (i.e., host vehicle), to the driver so as to make it possible to perform sight line guidance for making the driver perceive a target object that is a real object existing in the vicinity of the vehicle 10 and prevent the lowering of the driver's consciousness trying to perceive the target object with the driver's own attentiveness. Further, the driving support device 100 is capable of correcting intensity of visual stimulation (referred to also as "optical stimulation") given to the driver of the vehicle 10 by the visual attraction stimulation image to appropriate intensity depending on a value indicating body reaction of the driver of the vehicle 10 (e.g., a "body reaction probability" and a "body reaction level" which will be described later).

The control unit 101 includes a processor 102 as an information processing unit and a memory 103 as a storage unit or a non-transitory computer-readable storage medium storing necessary data and programs. For example, the processor 102 is capable of implementing the operation of the driving support device 100 by executing a driving support program stored in the memory 103. Processing by an image processing processor 104 may be executed by the processor 102. The control unit 101 and the image processing processor 104 may also be implemented as a part of a computer. The driving support device 100 may include processing circuitry that can implement the operation of the driving support device shown in FIG. 1.

The driving support device 100 further includes the image processing processor 104 as a display control unit, a camera 105 as a vicinity detection unit as a vicinity detector that acquires vicinity information regarding the vicinity of the vehicle 10, and a display device 107 that presents an image to the driver. The vicinity information is, for example, information on a scene in front of the vehicle 10, such as an image of the scene in front of the vehicle 10 (hereinafter referred to also as a "forward image") captured by the camera 105.

The camera 105, as a camera for capturing images of the outside of the vehicle, captures an image (which can also mean video) including a real object outside the vehicle 10 and transfers the acquired image data in a format that can be processed by the processor 102. The image data may include distance data indicating the distance from the vehicle 10 to the real object. Alternatively, the processor 102 may figure out the distance data by analyzing the image data. Incidentally, the vicinity detection unit may include a sensor such as a radar for detecting the real object in the vicinity of the vehicle 10 in addition to the camera 105 or instead of the camera 105.

The display device 107 is a display apparatus that displays each image frame generated by the processor 102 and the image processing processor 104 to be visually recognizable by the driver of the vehicle 10. The driver of the vehicle 10 can view the image frame displayed by the display device 107 (including the visual attraction stimulation image) in superimposition with the real scene perceived through the windshield (i.e., windscreen) of the vehicle 10.

The driving support device 100 further includes a viewpoint sensor 106 that detects a viewpoint position or the line of sight of the driver in the vehicle 10 and a biological sensor 108 that detects biological condition of the driver. The viewpoint sensor 106 and the biological sensor 108 constitute a body information acquisition unit 109 as a body information detector that acquires body information on the driver. Incidentally, the "viewpoint" is a point at which the line of sight oriented to view an object is cast. The "line of sight" is a line connecting the center of the eyes and the viewed object.

The biological sensor 108 includes one or more sensors that measure body reaction (i.e., reflexive body action) to visual stimulation sensed by the driver. The biological sensor 108 can also be an aggregate of multiple types of sensors. When a human senses visual stimulation, various types of body reaction appear in or on the body of the human. The body reaction appears on the face, for example. The body reaction appears depending on a mental state such as fear or surprise based on a situation visually recognized. The body reaction appearing on the face is, for example, a change in facial expression such as raised eyebrows or eyelids, eyes wide open, or the mouth spread horizontally wide.

Other examples of the body reaction include a flexor reflex as a reflex action occurring irrelevantly to the will in order to protect oneself, an increase in the heart rate, the blood pressure or the amount of perspiration due to excitement of the sympathetic nerve occurring when the driver sees a target object moving to approach the vehicle 10, and so forth. The biological sensor 108 detects such body reaction and measures the level of the body reaction. While the viewpoint sensor 106 and the biological sensor 108 are shown as separate components in FIG. 1, the viewpoint sensor 106 may also be provided as a part of the biological sensor 108. Incidentally, the body reaction detected or measured by the biological sensor 108 is not limited to the above-described examples.

The driving support device 100 further includes a CAN (Controller Area Network) interface 110. The CAN interface 110 is an interface for connecting the driving support device 100 to a CAN network that performs data exchange among various devices of the vehicle 10. The driving support device 100 acquires various types of driving data in regard to driving action of the driver via the CAN interface 110. The various types of driving data indicate, for example, how the brake pedal is pressed, how the accelerator pedal is pressed, rotational status of the steering wheel, status of the gearbox, and so forth. Upon recognizing an obstacle such as a human, another vehicle or an animal existing in front of the vehicle 10 and having a possibility of collision, the driver exhibits body reaction, that is, takes action, such as reducing the pressing of the accelerator pedal or lifting the foot off the accelerator pedal, pressing the brake pedal, changing the driver's grip on the steering wheel, or turning the steering wheel in a direction for increasing the distance to the obstacle. The CAN interface 110 is used for detecting whether such body reaction has occurred or not based on the driving data. Therefore, the body information acquisition unit 109 may include the CAN interface 110 in addition to the biological sensor 108 and the viewpoint sensor 106. In other word, body data as the body information acquired by the body information acquisition unit 109 may include information regarding the driving action of the driver acquired through the CAN interface 110, that is, action data.

Figure 2:
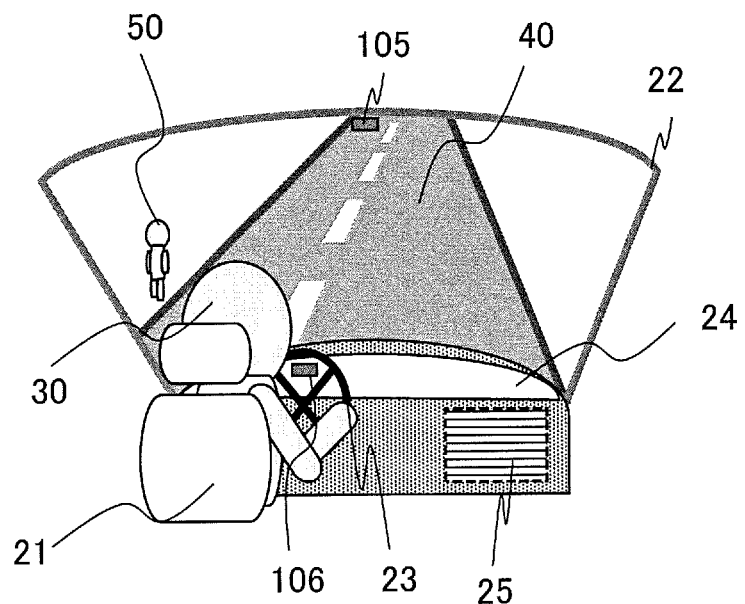
FIG. 2 is a diagram showing an example of a state in which a driver is using the driving support device according to the embodiment.

FIG. 2 is a diagram showing an example of a state in which the driver 30 of the vehicle 10 is using the driving support device 100 according to the embodiment. FIG. 2 shows a state in which the driver 30 seated on a driver seat 21 is driving the vehicle 10. In the example of FIG. 2, the driver 30 is viewing the scene in front of the vehicle 10 through the windshield 22, and a road 40 and a real object (a pedestrian as a target object 50 in FIG. 2) are visible to the driver 30. The camera 105 for capturing images of the scene in front of the vehicle 10 is set at a position in the vicinity of the top center of the windshield 22, for example. In general, the camera 105 is placed to be able to capture an image close to the scene the driver 30 is viewing through the windshield 22.

Further, the viewpoint sensor 106 is set at a position where the face, especially the eyes, of the driver 30 can be detected. The viewpoint sensor 106 may be set on a steering wheel 23, an instrument panel 24 or the like, for example. The processor 102, the memory 103, the image processing processor 104 and the CAN interface 110 shown in FIG. 1 may be set inside a dashboard 25 or the like.

The biological sensor 108 is arranged at an appropriate position in the vehicle 10 depending on the sensor's target of detection. For example, when the biological sensor 108 is a facial expression sensor for sensing the facial expression, the biological sensor 108 is arranged at the same position as the viewpoint sensor 106. When the biological sensor 108 is a sensor for measuring the amount of perspiration, the heart rate, the blood pressure value or the like of the driver 30, the biological sensor 108 is arranged, for example, on the steering wheel 23 touched by the driver 30, on the clothing worn by the driver 30, or on the seating face or a backrest part of the driver seat 21 on which the driver 30 is seated.

Figure 3:
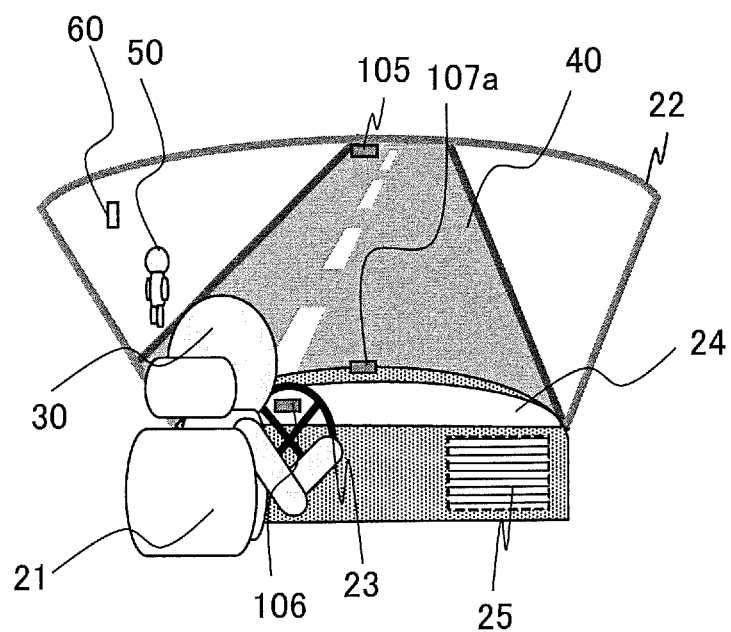
FIG. 3 is a diagram showing a case where a display device for displaying a visual attraction stimulation image generated by the driving support device according to the embodiment is a projector of a HUD.
Figure 4:
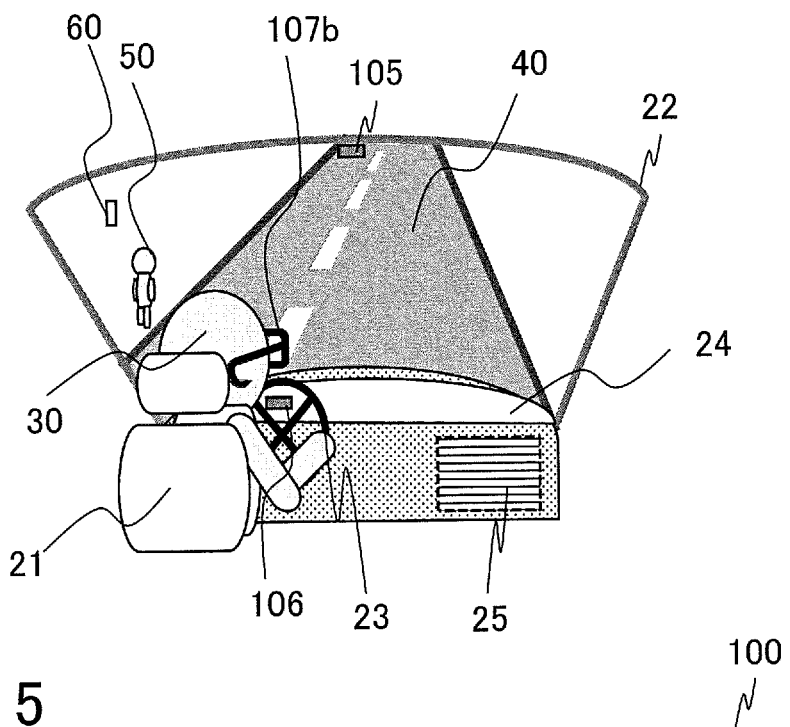
FIG. 4 is a diagram showing a case where the display device for displaying the visual attraction stimulation image generated by the driving support device according to the embodiment is AR glasses of an HMD.

The display device 107 is not shown in FIG. 2. The display device 107 is illustrated in FIG. 3 and FIG. 4. Incidentally, while FIG. 2 to FIG. 4 illustrate cases where the vehicle 10 has the steering wheel on the left-hand side and is traveling forward on a right-hand lane of the road 40, the structure of the vehicle 10, the driving lane and the shape of the road 40 are not limited to the examples shown in the diagrams.

FIG. 3 is a diagram showing a case where the display device for displaying the visual attraction stimulation image 60 generated by the driving support device 100 according to the embodiment is a projector 107a of a HUD (Head Up Display). In the example of FIG. 3, the projector 107a is arranged on the dashboard 25. The image frame projected by the projector 107a (including the visual attraction stimulation image 60) is projected onto a projection surface provided on the entire windshield 22 to be viewed by the driver 30. The driver 30 can view the image frame projected by the projector 107a in superimposition with the scene (including the real object) viewed through the windshield 22.

FIG. 4 is a diagram showing a case where the display device for displaying the visual attraction stimulation image 60 generated by the driving support device 100 according to the embodiment is AR (Augmented Reality) glasses 107b (e.g., glasses for augmented reality images) of an HMD (Head Mounted Display). In the example of FIG. 4, the driver 30 can view the image frame (including the visual attraction stimulation image 60) by wearing the AR glasses 107b. The driver 30 can view the image frame displayed by the AR glasses 107b in superimposition with the scene (including the real object) viewed through the windshield 22. Incidentally, the AR glasses 107b may be provided with the viewpoint sensor 106 and part or the whole of the biological sensor 108.

Figure 5:
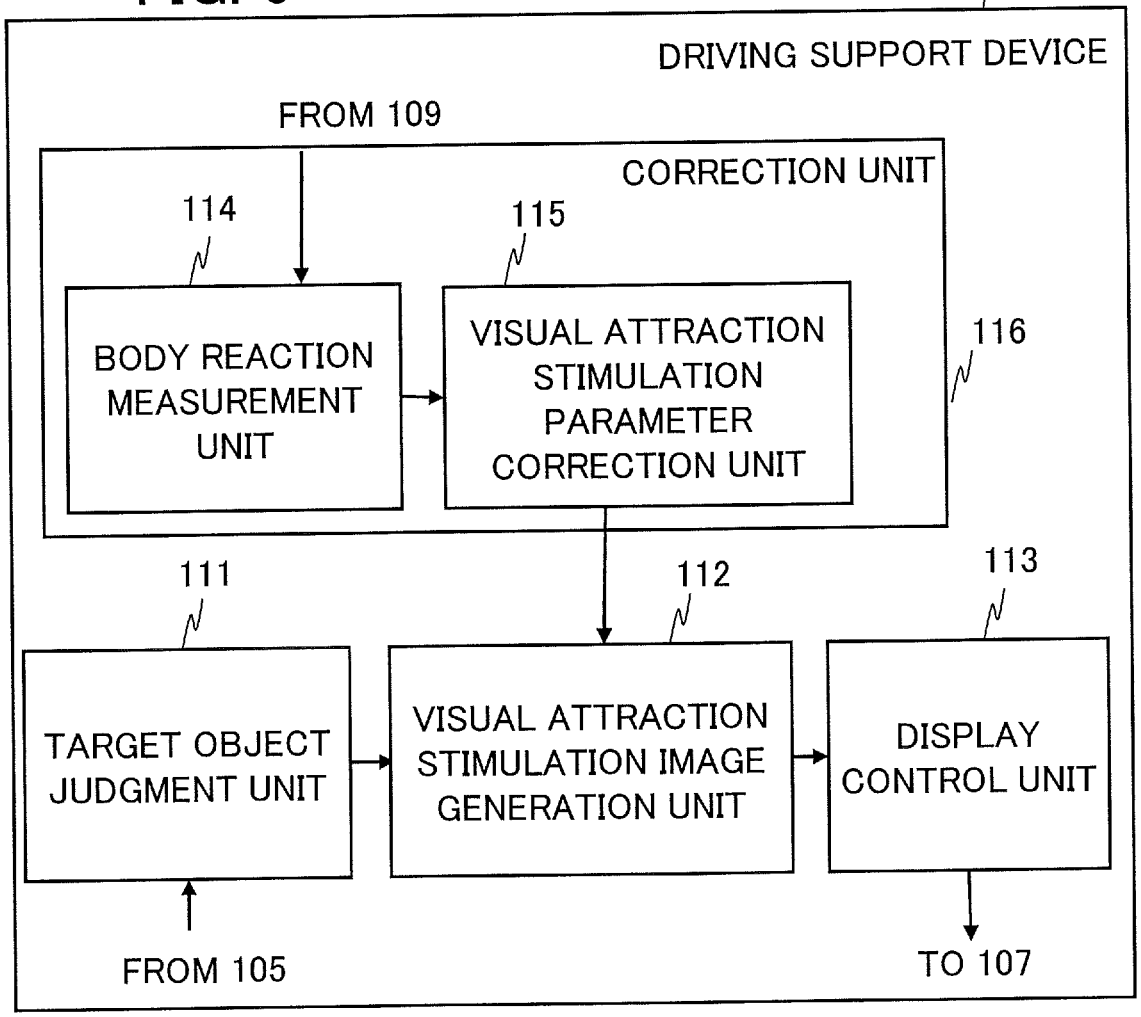
FIG. 5 is a functional block diagram showing the driving support device according to the embodiment.

FIG. 5 is a functional block diagram showing the driving support device 100 according to the embodiment. As shown in FIG. 5, the driving support device 100 includes a target object judgment unit 111, a visual attraction stimulation image generation unit 112, a display control unit 113, a body reaction measurement unit 114 as a body reaction measurer and a visual attraction stimulation parameter correction unit 115. The body reaction measurement unit 114 and the visual attraction stimulation parameter correction unit 115 constitute a correction unit 116 that corrects (i.e., adjusts) the intensity of the visual stimulation given to the driver by the visual attraction stimulation image.

The body reaction measurement unit 114 is capable of calculating a value indicating the body reaction based on the result of measuring a change in one or more of the facial expression, muscle tonus, the flexor reflex, the heart rate, the blood pressure value, the line of sight and the driving action of the driver 30. In order to support the driving performed by the driver 30 of the vehicle 10, the driving support device 100 makes the display device 107 display the visual attraction stimulation image 60 and gradually guides the line of sight of the driver 30 towards the target object by use of the visual attraction stimulation image 60. Further, the driving support device 100 corrects the intensity of the visual stimulation given to the driver of the vehicle 10 by the visual attraction stimulation image 60 to appropriate intensity depending on the value indicating the body reaction of the driver 30 of the vehicle 10 (e.g., the "body reaction probability" and the "body reaction level"). In the present application, the value indicating the body reaction of the driver 30 includes the "body reaction probability" and the "body reaction level".

The target object judgment unit 111 judges the target object 50, that is, a real object existing in the vicinity of the vehicle 10 and should be paid attention to by the driver 30, based on the vicinity information acquired by the camera 105 as the vicinity detection unit for capturing an image of or detecting a real object existing in the vicinity of the vehicle 10. The target object 50 is a real object (specifically, a moving object) existing in the vicinity of the vehicle and should be paid attention to by the driver 30. For example, the target object 50 is a real object that the vehicle 10 should avoid colliding with, such as a human, another vehicle or an animal. The target object 50 is not limited to a moving object. However, the target object judgment unit 111 may select the target object 50 while limiting the target object 50 to a moving object.

The visual attraction stimulation image generation unit 112 generates the visual attraction stimulation image 60 that appears to move from a position farther than the target object 50 towards a position where the target object 50 exists. The display control unit 113 makes the display device 107 display the visual attraction stimulation image 60 as an image that appears to be in superimposition with the target object 50 being a real object.

The body reaction measurement unit 114 performs a process of receiving the body data (e.g., various sensor data) from the body information acquisition unit 109, detecting once or more (e.g., repeatedly in an intermittent manner or repeatedly in a periodical manner) whether there exists body reaction to visual stimulation sensed by the driver 30 or not at the present time point by using the body information, calculating the probability of existence of the body reaction to visual stimulation (i.e., the body reaction probability), and calculating the level of the body reaction (i.e., the body reaction level) when the body reaction exists (when a value indicated by the body data is greater than or equal to a threshold value).

For example, when the body data is the amount of perspiration, the heart rate or the blood pressure value, the body reaction is judged to exist if the value indicating the body reaction is greater than or equal to a threshold value. For example, when the body data is facial expression data, a change in the facial expression data (e.g., how the mouth is open, how the eyes are open, movement of eyelids or eyebrows, or the like) is digitized into a numerical value, and the body reaction is judged to exist if the numerical value is greater than or equal to a threshold value. For example, when the body data is sight line data, movement of the line of sight indicated by the sight line data is digitized into a numerical value, and the body reaction is judged to exist if the numerical value is greater than or equal to a threshold value. For example, when the body data is driving action data, magnitude, speed or the like of movement of the driver indicated by the driving action data is digitized into a numerical value, and the body reaction is judged to exist if the numerical value is greater than or equal to a threshold value.

The visual attraction stimulation parameter correction unit 115 performs a process of judging which target object or which visual attraction stimulation image 60 caused the body reaction of the driver 30 based on the value indicating the body reaction (e.g., the body reaction probability and the body reaction level) calculated by the body reaction measurement unit 114, the target objects judged by the target object judgment unit 111 and the visual attraction stimulation images generated by the visual attraction stimulation image generation unit 112 and correcting (i.e., adjusting) display parameters of the visual attraction stimulation image 60 to be generated next based on the result of the judgment.

(2) Operation

Figure 6:
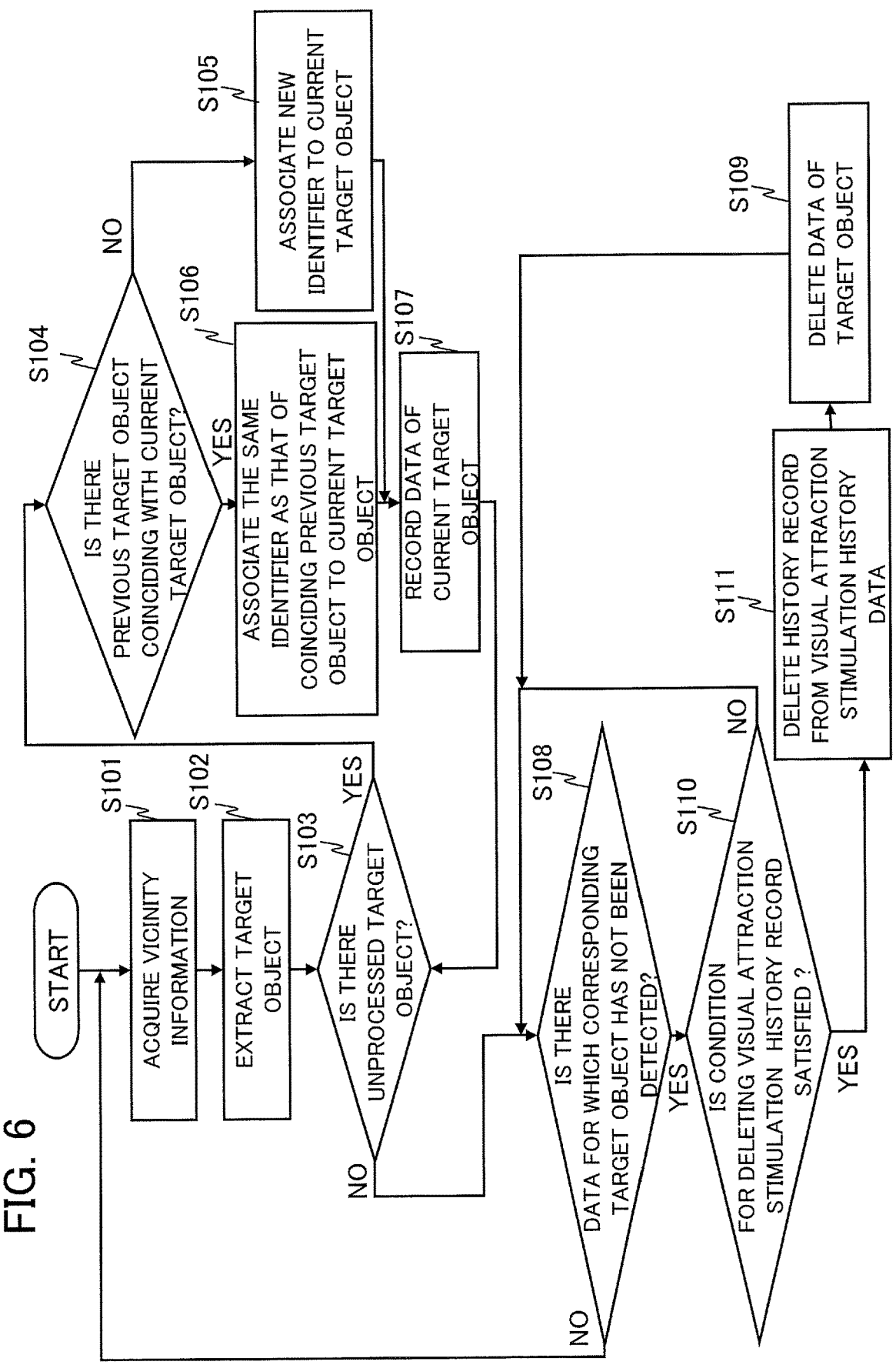
FIG. 6 is a flowchart showing the operation of a target object judgment unit of the driving support device according to the embodiment.

The operation of the driving support device 100 (i.e., the driving support method) according to the embodiment will be described below. FIG. 6 is a flowchart showing the operation of the target object judgment unit 111. A flow of process shown in FIG. 6 is executed repeatedly at predetermined time intervals during the traveling of the vehicle 10, for example.

First, in process step S101, the target object judgment unit 111 acquires the vicinity information indicating an image (including a real object) of the scene in front of the vehicle 10 captured by the camera 105 (i.e., the forward image), for example.

In the next process step S102, the target object judgment unit 111 performs an extraction process of extracting a real object that can be a target object from the forward image. The extracted real object is, for example, a moving real object such as a human, another vehicle or an animal. Means for extracting the real object from the forward image can be implemented by employing a known technology such as the computer vision technology in regard to the technology of acquiring information on the real world and the technology of recognizing an object. When there exist a plurality of extracted real objects, it is desirable to handle only one or some real objects having high priority among the plurality of real objects as the target object(s) 50 as the target(s) of generating the visual attraction stimulation image 60 (i.e., to perform the narrowing down so as to specify only one or more real objects among the plurality of real objects as the target object(s) 50) in order to reduce the processing load on the control unit 101 of the driving support device 100 and reduce the load on the driver 30.

The target object 50 satisfies one of the following first to fifth conditions, for example:
(First Condition) A real object whose probability of collision with the vehicle 10 is greater than or equal to a predetermined certain value.
(Second Condition) A real object whose distance from the vehicle 10 is less than or equal to a predetermined certain value.
(Third Condition) A real object moving towards the vehicle 10 and having a moving speed greater than or equal to a predetermined certain value.
(Fourth Condition) A real object judged not to have been perceived by the driver 30 yet based on the result of detection by the viewpoint sensor 106.
(Fifth Condition) A real object satisfying a combination of two or more conditions among the first to fourth conditions.

It is also possible to assign priority to each of the first to fourth conditions. Further, it is possible to judge that the priority of a moving object satisfying a greater number of conditions among the first to fourth conditions is higher. It is also possible to set the priority in the order of a human, another vehicle and an animal, for example. It is also possible to select a predetermined number of real objects having high priority as the target objects from real objects satisfying a predetermined condition.

Information on each target object 50 extracted in the process step S102 includes, for example, target object region information indicating a region occupied by the target object 50 in the image captured by the camera 105, target object distance information indicating the distance from the vehicle 10 to the target object 50, and target object barycentric coordinate information indicating the barycenter position of the target object. The number of target objects 50 may be two or more.

In process step S103, the target object judgment unit 111 judges whether or not each target object 50 extracted in the process step S102 is a target object on which processing of process steps S104-S107 has already been performed. Namely, when a plurality of target objects 50 are processed successively, the target object judgment unit 111 judges whether or not each target object 50 is a processed target object or an unprocessed target object. The target object judgment unit 111 advances the process to process step S108 when every target object 50 is a processed target object, or to process step S104 when a target object 50 is an unprocessed target object.

In the process step S104, the target object judgment unit 111 judges whether or not the current target object as the target object 50 currently being the processing target coincides with a previous target object as a target object extracted before the current target object. At that time, information on each previous target object is acquired from target object data recorded in the memory 103 in the process step S107 regarding the previous target object. The target object judgment unit 111 advances the process to process step S105 when there is no previous target object coinciding with the current target object, or to process step S106 when there is a previous target object coinciding with the current target object.

In the process step S105, the target object judgment unit 111 performs a process of associating a new identifier, for uniquely identifying the new target object being the current target object, to the current target object.

In the process step S106, the target object judgment unit 111 performs a process of associating an identifier for uniquely identifying the current target object (i.e., an identifier of the coinciding previous target object) to the current target object.

In the process step S107, the target object judgment unit 111 records the target object data indicating the target object 50 in the memory 103. The target object data includes, for example, the identifier associated in the process step S105 or S106, the image data of the scene in front of the vehicle 10 including the target object 50, distance data indicating the distance to the target object 50, data indicating the region occupied by the target object 50, the barycentric coordinates of the target object 50, the priority of the target object 50, and so forth. Further, the target object data includes various types of flag data that become necessary in other processes or various types of parameters that become necessary in other processes, for example. The flag data may include, for example, an already-viewed flag (which is off as an initial value) indicating the existence/nonexistence of the target object data, a display completion flag (which is off as an initial value) indicating whether the visual attraction stimulation image has been displayed or not, a flag indicating whether or not the value indicating the body reaction of the driver 30 exceeds the threshold value (which is off as an initial value), or the like. After completing the recording in the process step S107, the target object judgment unit 111 returns the process to the process step S103 and repeats the processing of the process steps S104 to S107 for each target object 50 existing in the same forward image.

The target object judgment unit 111 advances the process to the process step S108 when the processing for all the target objects 50 detected in the image acquired in the process step S101 is finished. In the process step S108, the target object judgment unit 111 judges whether or not there is a previous target object, among the recorded previous target objects, that coincided with no current target object. The target object judgment unit 111 advances the process to process step S110 when there is such a previous target object (YES in S108), or returns the process to the process step S101 when there is no such previous target object (NO in S108).

In the process step S110, the target object judgment unit 111 judges whether or not a condition for deleting the target object data as data regarding the target object and a corresponding visual attraction stimulation plan is satisfied. When the condition is not satisfied (NO in S110), the target object judgment unit 111 returns the process to the process step S108 and continues the process for the next visual attraction stimulation image. When the condition is satisfied (YES in S110), the target object judgment unit 111 advances the process to process step S111. The condition for deleting the data is, for example, that the time that passed since various flags turned to on is longer than or equal to a predetermined certain time. However, the condition for deleting the data is not limited to this example.

In the process step S111, the target object judgment unit 111 deletes a corresponding history record from visual attraction stimulation history data that is used for managing history records of visual attraction stimulation images 60 presented to the driver 30, and thereafter advances the process to process step S109. The visual attraction stimulation history data has been recorded in the memory 103, and the generation of the visual attraction stimulation history data is carried out by an internal process of the visual attraction stimulation image generation unit 112.

In the process step S109, the target object judgment unit 111 deletes the previous target object that coincided with no current target object from the memory 103 and removes unnecessary data regarding the deleted previous target object from the memory 103. After the process step S109, the target object judgment unit 111 advances the process to the process step S108.

However, the target object judgment unit 111 may also be configured not to carry out the deletion in the process step S109. This is because there are possibly cases where the extraction of the target objects 50 in the process step S102 cannot be performed correctly due to noise, restriction on the processing method, or the like. Further, the target object judgment unit 111 may delete unnecessary data from the memory 103 when the YES judgment in the process step S108 has been made for a predetermined number of times or more. The target object judgment unit 111 may also be configured to delete unnecessary data from the memory 103 after the passage of a predetermined certain time after the YES judgment in the process step S108.

Figure 7:
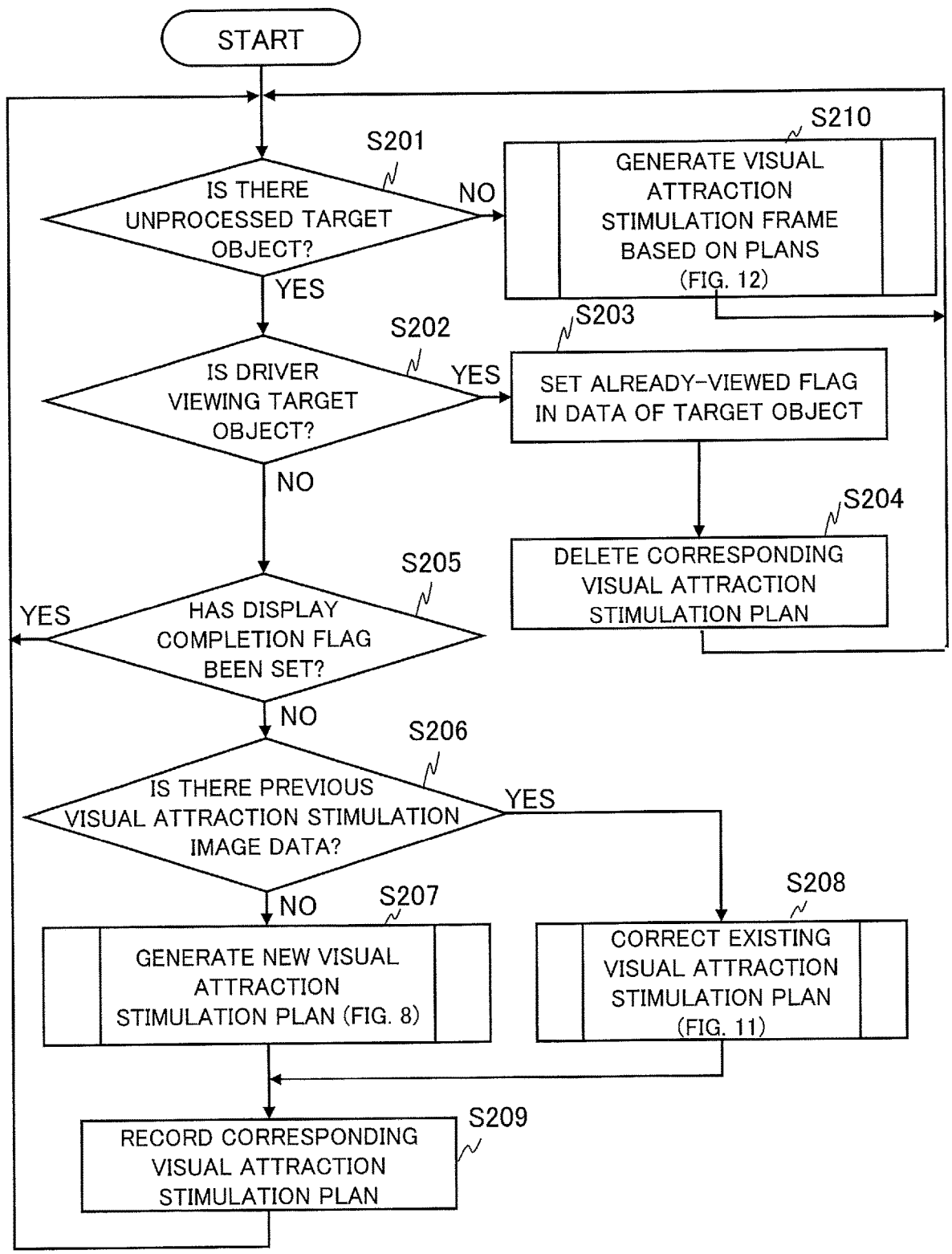
FIG. 7 is a flowchart showing the operation of a visual attraction stimulation image generation unit of the driving support device according to the embodiment.

FIG. 7 is a flowchart showing the operation of the visual attraction stimulation image generation unit 112. The visual attraction stimulation image generation unit 112 generates or corrects (i.e., modifies) the visual attraction stimulation plan, as a plan regarding what kind of visual attraction stimulation image should be generated for each target object 50, based on the target object data regarding the target objects 50 extracted by the target object judgment unit 111, and generates a visual attraction stimulation frame including the visual attraction stimulation images.

In process step S201, the visual attraction stimulation image generation unit 112 judges whether or not there is target object data not processed yet by the visual attraction stimulation image generation unit 112 among the target object data recorded in the memory 103, that is, judges whether or not there is an unprocessed target object. The visual attraction stimulation image generation unit 112 advances the process to process step S202 when there is an unprocessed target object, or to process step S210 when there is no unprocessed target object.

In the process step S202, the visual attraction stimulation image generation unit 112 judges whether or not the driver 30 is viewing the target object 50. This judgment can be made based on whether the viewpoint overlaps with the target object region or not by using the viewpoint position and the line of sight of the driver 30 acquired by the viewpoint sensor 106 at a time closest to the time of the capture of the forward image by the camera 105, for example. In this case, it is assumed that parameters of the viewpoint sensor 106 and parameters of the camera 105 have previously been calibrated appropriately.

However, there can occur a situation in which the viewpoint overlaps with the target object region by accident due to movement of the line of sight of the driver 30. Therefore, the visual attraction stimulation image generation unit 112 may be configured to judge that the driver 30 is viewing the target object 50 when the state in which the viewpoint overlaps with the target object region continues for a predetermined certain time or longer. In this case, the time (i.e., duration time) for which the driver 30 viewed the target object 50 is additionally recorded as the target object data.

Further, the visual attraction stimulation image generation unit 112 may also be configured to judge that the driver 30 is viewing the target object 50 when the already-viewed flag recorded as the target object data is on.

The visual attraction stimulation image generation unit 112 advances the process to process step S203 when the driver 30 is judged to be viewing the target object 50, or to process step S205 when the driver 30 is judged to be not viewing the target object 50.

In the process step S203, in order to indicate that the target object data of the target object 50 that the driver 30 is already viewing is target object data regarding an already-viewed target object 50, the visual attraction stimulation image generation unit 112 changes the already-viewed flag in the corresponding target object data to on, and thereafter advances the process to process step S204. However, even when the driver 30 is judged once to be viewing the target object 50, the level of recognition of the target object by the driver 30 thereafter drops with the passage of time of not viewing the target object. Therefore, the visual attraction stimulation image generation unit 112 may be configured to return the display completion flag to off and return the already-viewed flag to off when the time that passes from the judgment that the driver 30 is viewing the target object to the next judgment that the driver 30 is viewing the target object is longer than or equal to a predetermined certain time.

In the process step S204, the visual attraction stimulation image generation unit 112 deletes the visual attraction stimulation plan corresponding to the target object 50 whose already-viewed flag is on from the memory 103, determines not to generate the visual attraction stimulation image for this target object 50, and returns the process to the process step S201.

In the process step S205, the visual attraction stimulation image generation unit 112 judges whether or not the displaying of the visual attraction stimulation image 60 for the target object 50 has already been completed. The visual attraction stimulation image generation unit 112 judges that the displaying of the visual attraction stimulation image 60 has been completed if the display completion flag in the corresponding target object data is on, or judges that the displaying of the visual attraction stimulation image 60 has not been completed yet if the display completion flag is off. The visual attraction stimulation image generation unit 112 returns the process to the process step S201 if it is completed (YES in S205), or advances the process to process step S206 if it is not completed (NO in S205).

In the process step S206, the visual attraction stimulation image generation unit 112 judges whether or not the visual attraction stimulation plan corresponding to the target object 50 has already been generated. The visual attraction stimulation image generation unit 112 advances the process to process step S207 if the visual attraction stimulation plan has not been generated yet, or to process step S208 if the visual attraction stimulation plan has already been generated.

In the process step S207, the visual attraction stimulation image generation unit 112 performs a process of generating a new visual attraction stimulation plan for the target object 50 for which the visual attraction stimulation plan has not been generated yet.

Figure 8:
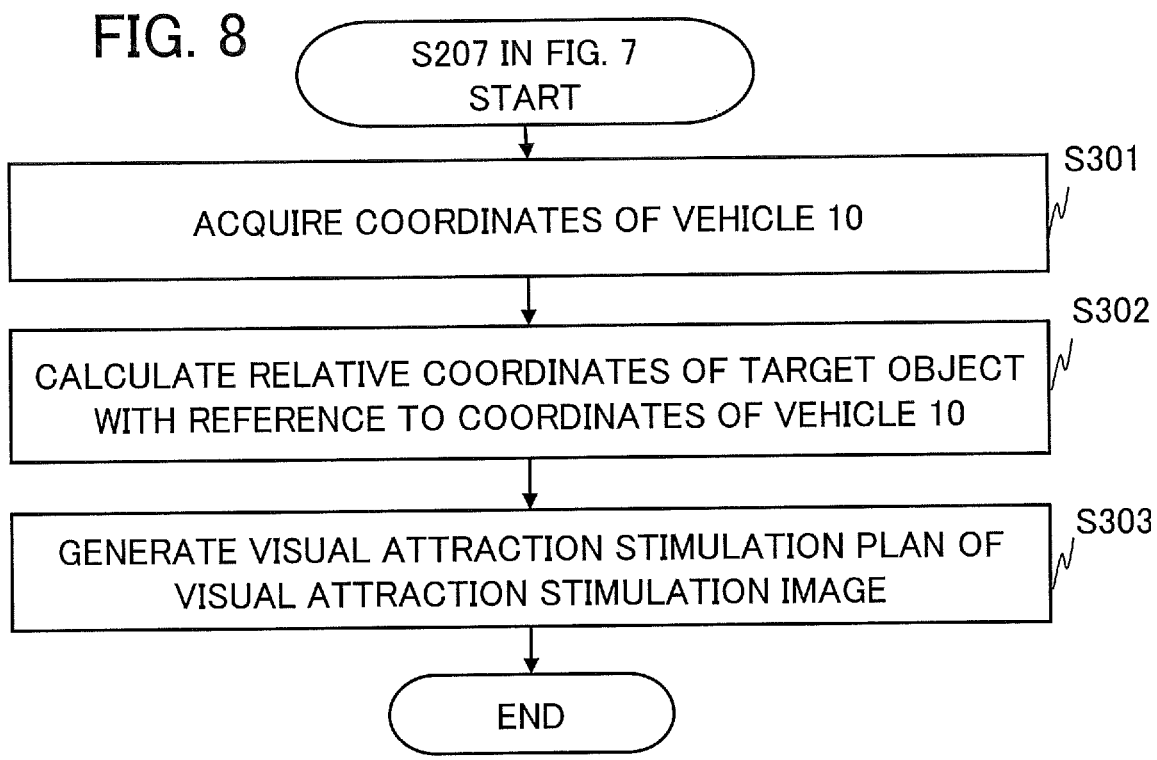
FIG. 8 is a flowchart showing a process of generating a new visual attraction stimulation plan performed by the visual attraction stimulation image generation unit of the driving support device according to the embodiment.

FIG. 8 is a flowchart showing the process of generating a new visual attraction stimulation plan in the process step S207. In process step S301, the visual attraction stimulation image generation unit 112 acquires the coordinates of the vehicle 10 driven by the driver 30. While the coordinates of the vehicle 10 may be coordinates in a global coordinate system obtained by using a GPS (Global Positioning System) or the like, the coordinates of the vehicle 10 may also be a position in a coordinate system defined with reference to the position of the driving support device 100. For example, a coordinate system in which the installation position of the camera 105 is set at reference coordinates (i.e., origin) may be used. It is also possible to set the barycenter position of the vehicle 10 at the reference coordinates, or to set the central position of the front bumper at the reference coordinates. Alternatively, it is also possible to set the barycentric coordinates of the vehicle 10 or the coordinates of the central position of the front bumper of the vehicle 10, situated at a position where the vehicle 10 is expected to exist at a time point (i.e., future time) after the passage of a predetermined certain time from the present time, at the reference coordinates.

In process step S302, the visual attraction stimulation image generation unit 112 performs a process of transforming the coordinates of the target object into coordinates in a coordinate system in which the driving support device 100 is placed at a reference position. The coordinate system in which the driving support device 100 is placed at the reference position is, for example, a coordinate system in which the installation position of the camera 105 is set at the origin. By this coordinate transformation, the coordinates of the target object 50 can be represented by coordinates in the same coordinate system as the coordinates of the vehicle 10.

In process step S303, the visual attraction stimulation image generation unit 112 generates the visual attraction stimulation plan as a plan regarding how the visual attraction stimulation image should be presented to the driver 30.

Figure 9:
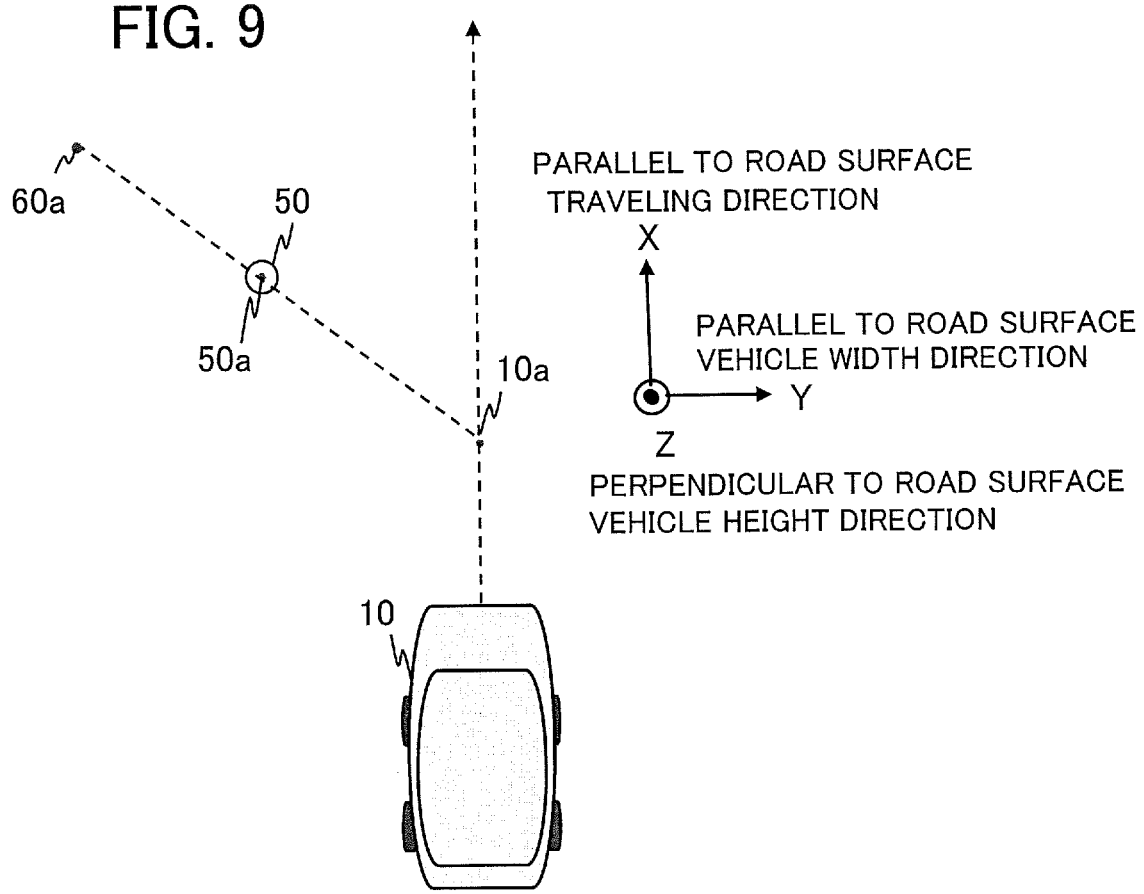
FIG. 9 is an explanatory diagram showing a process of generating the visual attraction stimulation plan performed by the visual attraction stimulation image generation unit of the driving support device according to the embodiment.

FIG. 9 is an explanatory diagram showing the process of generating the visual attraction stimulation plan performed by the visual attraction stimulation image generation unit 112. An XYZ coordinate system is shown in FIG. 9. The X-axis is a coordinate axis parallel to the road surface and oriented in a traveling direction of the vehicle 10. The Y-axis is a coordinate axis parallel to the road surface and oriented in a vehicle width direction of the vehicle 10. The Z-axis is a coordinate axis perpendicular to the road surface and oriented in a vehicle height direction of the vehicle 10.

The process of generating the visual attraction stimulation plan will be described below in regard to the example in which the target object 50 and the vehicle 10 exist. In the example of FIG. 9, coordinates 50a are target object coordinates as coordinates of the target object 50, and coordinates 10a are coordinates of the vehicle 10. The coordinates 10a are, for example, coordinates where the vehicle 10 is expected to exist at a time (T+T0) after the passage of a predetermined certain time T after the time T0 at which the visual attraction stimulation image is generated.

Coordinates 60a are coordinates representing an initial position of drawing the visual attraction stimulation image. The coordinates 60a are coordinates on a plane including a half line extending from the coordinates 10a of the vehicle 10 towards the coordinates 50a of the target object 50 and perpendicular to the ground (i.e., road surface). The height (i.e., Z-axis direction position) of the coordinates 60a is set to be equal to the Z-axis direction position of the coordinates 50a, for example. The coordinates 60a reach the coordinates 50a when the coordinates 60a move towards the coordinates 50a at a moving speed S for a movement time T1. The coordinates 60a are situated on a side opposite to the coordinates 10a with reference to the coordinates 50a. The coordinates 60a are initial coordinates of the visual attraction stimulation image.

The visual attraction stimulation image is presented as a visual stimulation image that moves from the coordinates 60a as a starting point towards the target object 50 at the moving speed S for the movement time T1. Further, the visual attraction stimulation image is presented as a visual stimulation image that is superimposed on the target object 50 for a superimposition time T2 after reaching the target object 50.

The moving speed S, the movement time T1 and the superimposition time T2, which can be predetermined fixed values, can also be variable values varying depending on the situation. For example, by setting the moving speed S to be higher than or equal to a lowest speed (lower limit speed) and lower than a highest speed (upper limit speed) perceivable as movement in the human's peripheral visual field, the movement can be perceived in the peripheral visual field of the driver 30 even when the driver 30 is not pointing the line of sight towards the vicinity of the target object.

Further, by setting the movement time T1 with reference to the human's visual reaction speed, it is possible to complete the superimposition on the target object 50 before the movement of the visual attraction stimulation image itself is perceived in the central visual field of the driver 30. In this case, it is possible to avoid presenting too much difference between stimulation given to the driver 30 by the visual attraction stimulation image and stimulation given to the driver 30 by the target object 50.

It is also possible to assign weights to the display parameters of the visual attraction stimulation image (e.g., the moving speed S, the movement time T1 and the superimposition time T2) according to the distance between the viewpoint position of the driver 30 and the coordinates of the target object 50 at each time point. For example, the weighting may be done so as to cause a positive correlation between the distance to the target object 50 and the moving speed S or between the distance to the target object 50 and the movement time T1.

Figure 10:
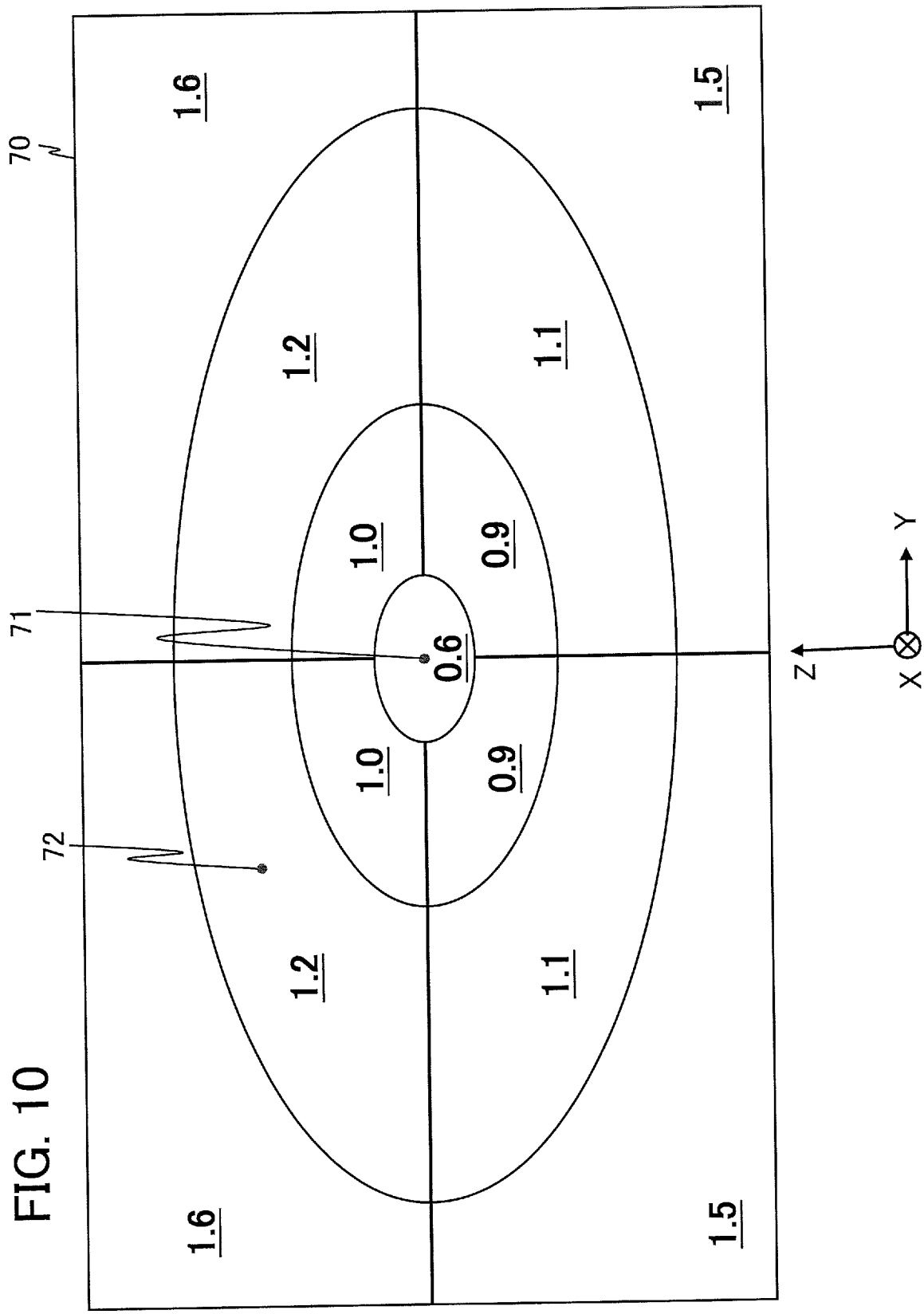
FIG. 10 is an explanatory diagram showing weights used in a visual attraction stimulation plan generation process performed by the visual attraction stimulation image generation unit of the driving support device according to the embodiment.

The weighting may also be done based on a viewpoint vector of the driver 30 at each time point. FIG. 10 is an explanatory diagram showing the viewpoint vector and a weight value for each spatial division region on a virtual plane 70 arranged right in front of the driver 30 and in parallel with the YZ plane. In FIG. 10, the viewpoint vector of the driver 30 becomes a perpendicular line to the plane 70 when the viewpoint vector crosses a point 71. While various methods can be employed as the method of dividing space into regions, the division in the example of FIG. 10 is carried out by setting a plurality of concentric ellipses centering at the point 71 each having a radius in the horizontal direction longer than a radius in the vertical direction and by using a horizontal line and a vertical line passing through the point 71. The weight value described in a region including a point 72 where a line segment connecting the coordinates of the target object 50 and the eye position of the driver 30 intersects with the plane 70 is used for weighting calculation in the calculation of the display parameters. In FIG. 10, the weight value is determined as 1.2 and the values of the moving speed S and the movement time T1 are changed according to the weight value (e.g., in proportion to the weight value).

It is also possible to determine the weight value to suit personal characteristics of the driver 30 since those display parameters vary depending on the characteristics of each person as the driver 30. Further, since even the display parameters for each person vary depending on physical condition or the like, it is also possible to employ a biological sensor and change the weight value according to condition of the driver 30 detected based on the result of detection by the biological sensor.

Especially, parameters like the speed limits are sensory parameters as viewed from the driver 30's eye, and thus such parameters may be determined after temporarily transforming the coordinate system into a coordinate system in which coordinates of the driver 30's eye are placed at the origin. The coordinates of the driver 30's eye in that case may be transformed by using data acquired from the viewpoint sensor 106 and relative positions of the viewpoint sensor 106 and the camera 105.

Next, specific contents of the visual attraction stimulation image will be described below. The visual attraction stimulation image can be a minimum rectangular figure containing the target object 50, a figure obtained by enhancing the edge of the target object to outline the target object, a figure generated by adjusting the color of the target object such as luminance, or the like. The visual attraction stimulation image can also be a minimum rectangular figure containing the target object or a figure generated by adjusting the color such as luminance in regard to an image region surrounded by the edge of the target object when the edge is translated to the initial coordinates of the visual attraction stimulation image. The type of the visual attraction stimulation image is not particularly limited. However, the direction of the figure displayed as the visual attraction stimulation image is desired to be set to be in parallel with a surface containing the target object 50. Alternatively, the direction of the target object 50 may be set to be orthogonal to a vector heading from the initial coordinates of the visual attraction stimulation image towards the coordinates of the vehicle 10.

The visual attraction stimulation plan generated in the process step S303 includes a generation time T0, the initial coordinates of the visual attraction stimulation image, the moving speed S and the movement time T1 in regard to the movement of the visual attraction stimulation image towards the moving target object, the superimposition time T2 for which the visual attraction stimulation image is superimposed on the target object, a content type of the visual attraction stimulation image, and various parameters for determining the contents of the visual attraction stimulation.

By the completion of the generation of the visual attraction stimulation plan in FIG. 8, the process step S207 is completed and the visual attraction stimulation image generation unit 112 advances the process to process step S209.

In the process step S208 in FIG. 7, the visual attraction stimulation image generation unit 112 performs a visual attraction stimulation image correction process for the target object 50 for which the visual attraction stimulation plan has already been generated. In the process step S208, the visual attraction stimulation plan has already been generated, and thus the contents of the visual attraction stimulation plan are corrected to suit the situation at the present time point.

Figure 11:
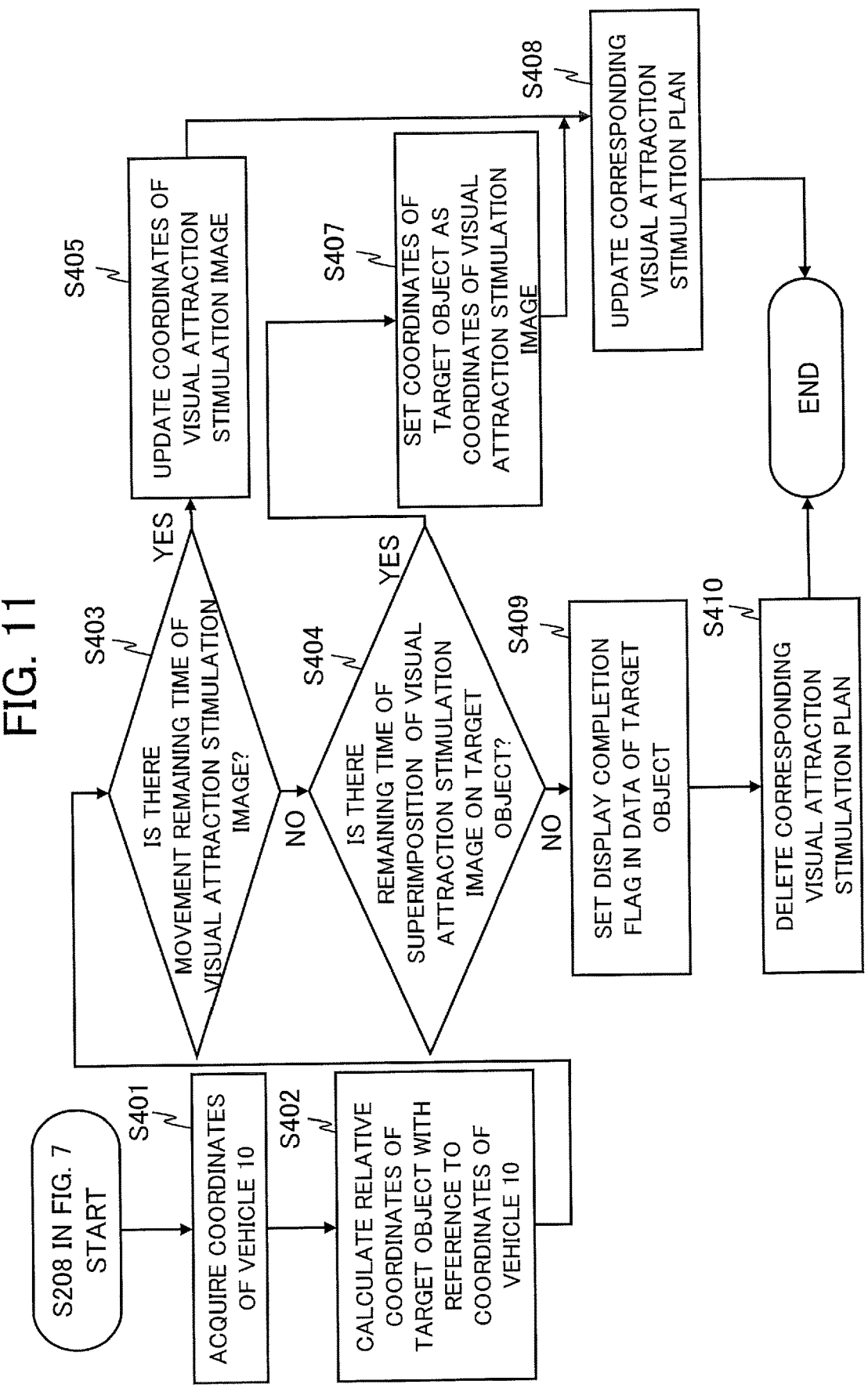
FIG. 11 is a flowchart showing an existing visual attraction stimulation plan correction process performed by the visual attraction stimulation image generation unit of the driving support device according to the embodiment.

FIG. 11 is a flowchart showing the process step S208 as an existing visual attraction stimulation plan correction process performed by the visual attraction stimulation image generation unit 112.

Process step S401 is the same processing as the process step S301 in FIG. 8. Process step S402 is the same processing as the process step S302 in FIG. 8.

In process step S403, the visual attraction stimulation image generation unit 112 judges whether or not there is a remaining time in the movement time T1 of the movement of the visual attraction stimulation image towards the target object 50. Specifically, let T represent the present time, the visual attraction stimulation image generation unit 112 judges that there is a remaining time in the movement time T1 (YES in S403) and advances the process to process step S405 if a condition "T−T0<T1" is satisfied, or judges that there is no remaining time in the movement time T1 (NO in S403) and advances the process to process step S404 otherwise.

In the process step S404, the visual attraction stimulation image is already in the state of being in superimposition on the target object 50. In this case, the visual attraction stimulation image generation unit 112 judges whether or not there is a remaining time in the superimposition time T2 of the superimposition of the visual attraction stimulation image on the target object 50. Specifically, let T represent the present time, the visual attraction stimulation image generation unit 112 judges that there is a remaining time in the superimposition time T2 (YES in S404) and advances the process to process step S407 if a condition "T−T0<T1+T2" is satisfied, or judges that there is no remaining time in the superimposition time T2 (NO in S404) and advances the process to process step S409 otherwise.

In the process step S405, the visual attraction stimulation image is in a state of moving towards the target object 50 of the visual attraction stimulation image. At that time, the visual attraction stimulation image generation unit 112 calculates coordinates of the visual attraction stimulation image as coordinates where the visual attraction stimulation image at the present time point should exist. The method of calculating the coordinates of the visual attraction stimulation image is basically the same as the method of calculating the initial coordinates of the visual attraction stimulation image; however, "T1−(T−T0)" including the present time T is used for the calculation in place of the movement time T1. As the coordinates of the vehicle 10, it is also possible to directly use the coordinates used for determining the initial coordinates of the visual attraction stimulation image without recalculating the coordinates with reference to the present time. After calculating the coordinates of the visual attraction stimulation image, the visual attraction stimulation image generation unit 112 advances the process to process step S408.

In the process step S407, the visual attraction stimulation image is in the state of being in superimposition on the target object of the visual attraction stimulation image. In this case, the visual attraction stimulation image generation unit 112 calculates coordinates of the visual attraction stimulation image as coordinates where the visual attraction stimulation image at the present time point should exist. In the process step S407, the visual attraction stimulation image is in superimposition on the target object of the visual attraction stimulation image differently from the case of the process step S405, and thus the target object coordinates are used as the coordinates of the visual attraction stimulation image. After the calculation of the coordinates of the visual attraction stimulation image, the visual attraction stimulation image generation unit 112 advances the process to the process step S408.

In the process step S408, the visual attraction stimulation image generation unit 112 updates the visual attraction stimulation plan by using the coordinates of the visual attraction stimulation image calculated in the process step S405 or S407, renews the visual attraction stimulation plan in the memory 103, and ends the processing of the process step S208.

In the process step S404, when the superimposition time of the superimposition of the visual attraction stimulation image on the target object of the visual attraction stimulation image is over, the process advances to the process step S409.

In this case, the visual attraction stimulation image generation unit 112 turns on the display completion flag in the target object data in order to stop the displaying of the visual attraction stimulation image.

In process step S410, the visual attraction stimulation image generation unit 112 deletes the visual attraction stimulation plan that has become unnecessary from the memory 103. After completion of the deletion, the processing of the process step S208 in FIG. 7 ends and the process advances to processing of the process step S209 in FIG. 7.

In the process step S209, the visual attraction stimulation image generation unit 112 records the visual attraction stimulation plan generated in the process step S207 or corrected in the process step S208 in the memory 103. After completing the recording, the visual attraction stimulation image generation unit 112 returns the process to the process step S201 and performs the process in regard to the next target object.

When there is no unprocessed target object in the process step S201, the process advances to the process step S210. The process step S210 is processing performed when the processing by the visual attraction stimulation image generation unit 112 for the target objects in the current forward image is completed, in which the visual attraction stimulation frame for displaying the visual attraction stimulation images is generated based on all the visual attraction stimulation plans.

Figure 12:
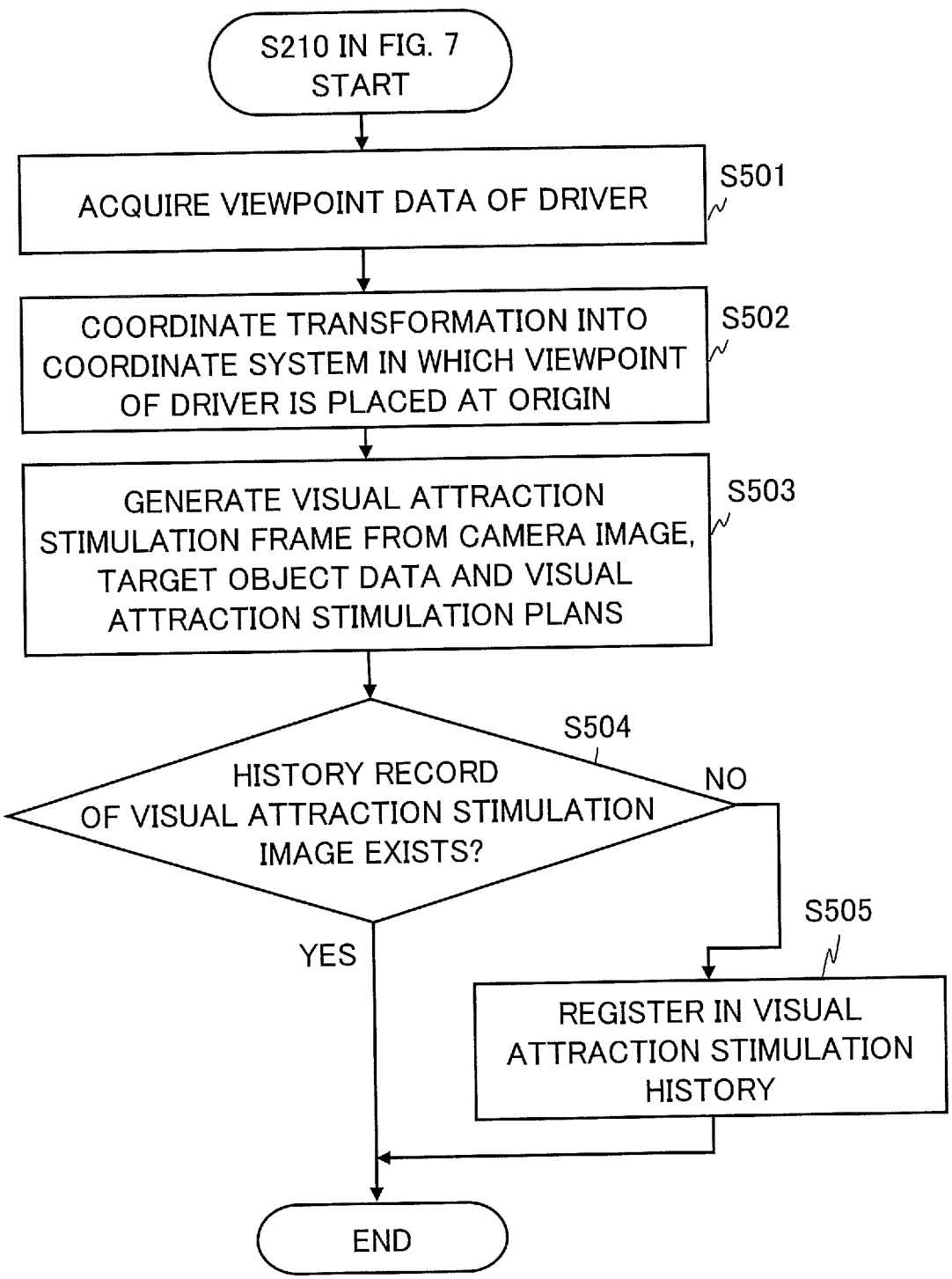
FIG. 12 is a flowchart showing a visual attraction stimulation frame generation process performed by the visual attraction stimulation image generation unit of the driving support device according to the embodiment.

FIG. 12 is a flowchart showing the process step S210 as a visual attraction stimulation frame generation process performed by the visual attraction stimulation image generation unit 112.

In process step S501, the visual attraction stimulation image generation unit 112 acquires the viewpoint coordinates of the driver 30 from the viewpoint sensor 106. In process step S502, the visual attraction stimulation image generation unit 112 transforms the coordinate system used in the processing so far into a coordinate system in which the viewpoint coordinates of the driver 30 acquired in the process step S501 is placed at the origin. In process step S503, the visual attraction stimulation image generation unit 112 generates the visual attraction stimulation frame including one or more visual attraction stimulation images to be actually presented visually, by using data of the transformed coordinate system, and transfers the generated visual attraction stimulation frame to the display control unit 113.

The display control unit 113 successively provides the display device 107 with the visual attraction stimulation frames generated by the visual attraction stimulation image generation unit 112 and thereby makes the display device 107 display the visual attraction stimulation frames to the driver 30.

In the process step S503, the visual attraction stimulation image generation unit 112 generates the visual attraction stimulation frame to be actually presented visually by using the data of the transformed coordinate system, transfers the generated visual attraction stimulation frame to the display control unit 113, and advances the process to process step S504.

In the process step S504, the visual attraction stimulation image generation unit 112 judges whether a history record regarding each visual attraction stimulation image being handled as an object exists in the visual attraction stimulation history data or not (i.e., already registered or not). The visual attraction stimulation image generation unit 112 advances the process to process step S505 if the history record does not exist, or ends the process if the history record exists.

In the process step S505, the visual attraction stimulation image being handled as an object does not exist in the visual attraction stimulation history data, and thus the visual attraction stimulation image generation unit 112 adds the visual attraction stimulation image being handled as an object to the visual attraction stimulation history data and ends the process.

Figure 13:
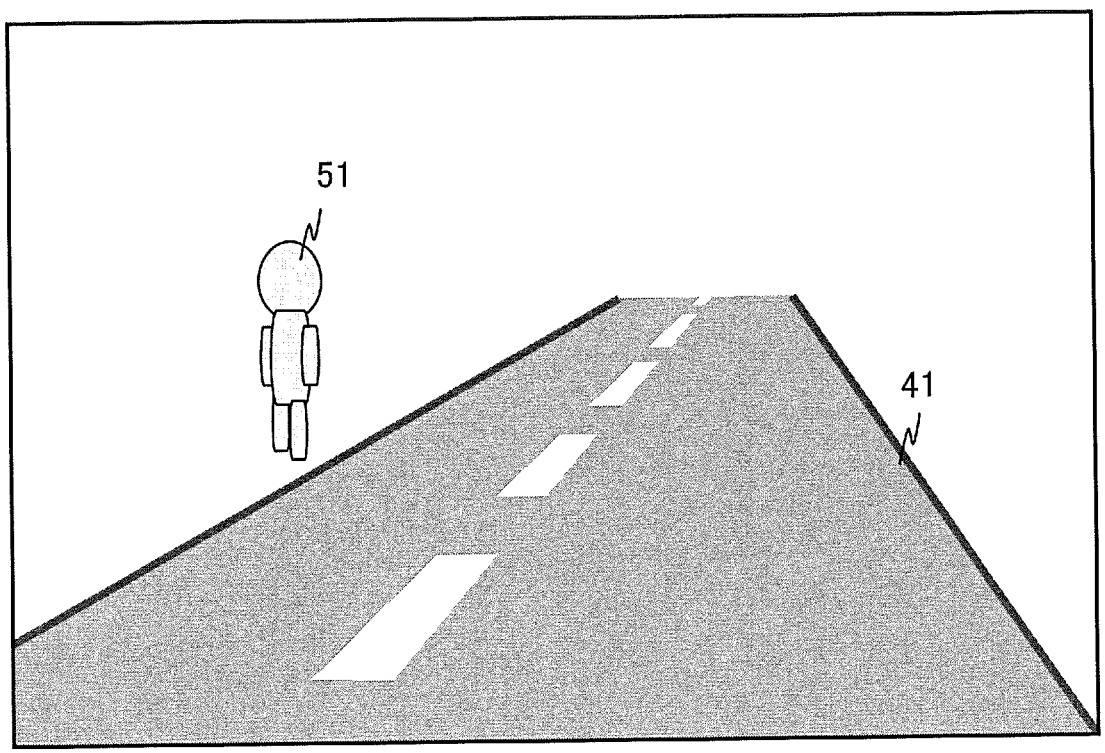
FIG. 13 is a diagram showing a state in which a pedestrian as a target object is walking on a sidewalk on a left-hand side and a vehicle is traveling on a right-hand lane of a roadway.

FIG. 13 is a diagram showing an example of the forward image in which a pedestrian 51 as a target object is walking on a sidewalk on the left-hand side of a road and the vehicle 10 is traveling on a right-hand lane of a roadway 41. FIGS. 14A to 14E, FIGS. 15A to 15E and FIGS. 16A to 16E show display examples of the visual attraction stimulation image when the forward image shown in FIG. 13 is acquired.

FIGS. 14A to 14E, FIGS. 15A to 15E and FIGS. 16A to 16E show the visual attraction stimulation images 60, 61 and 62 presented by the display device 107 and forward scenes that the driver 30 is viewing at certain times.

Figure 14A:
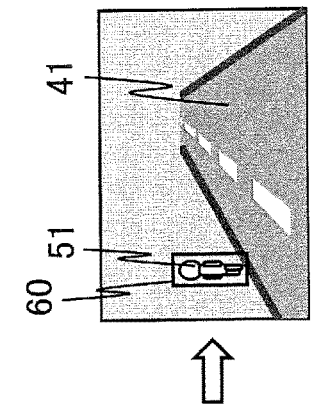
FIGS. 14A to 14E are diagrams showing an example of the visual attraction stimulation images displayed by the driving support device according to the embodiment.
Figure 16A:
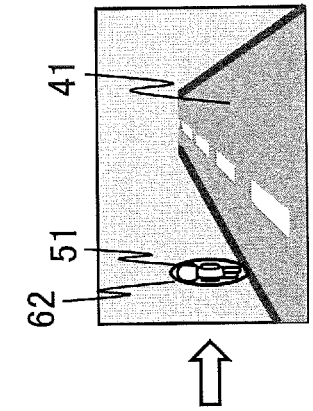
FIGS. 16A to 16E are diagrams showing another example of the visual attraction stimulation images displayed by the driving support device according to the embodiment.

FIG. 14A, FIG. 15A and FIG. 16A show the forward scene and the visual attraction stimulation images 60, 61 and 62 at the time point when the initial coordinates of the visual attraction stimulation images 60, 61 and 62 have been calculated.

Figure 14B:
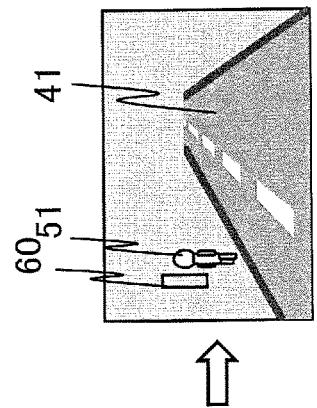
Figure 16B:
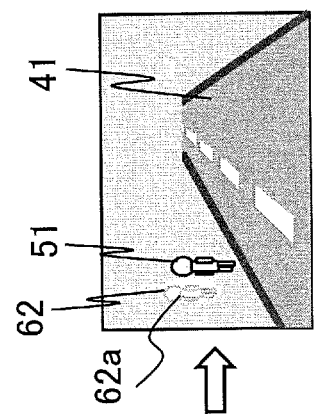

FIG. 14B, FIG. 15B and FIG. 16B show the forward scene and the moving visual attraction stimulation images 60, 61 and 62 at a time when T−T0<T1 is satisfied.

Figure 14C:
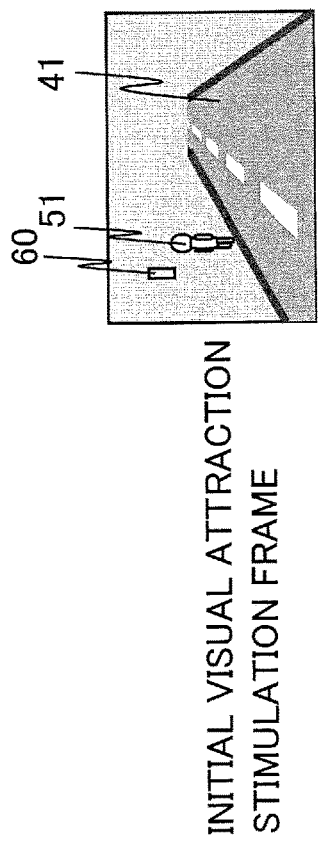
Figure 16C:
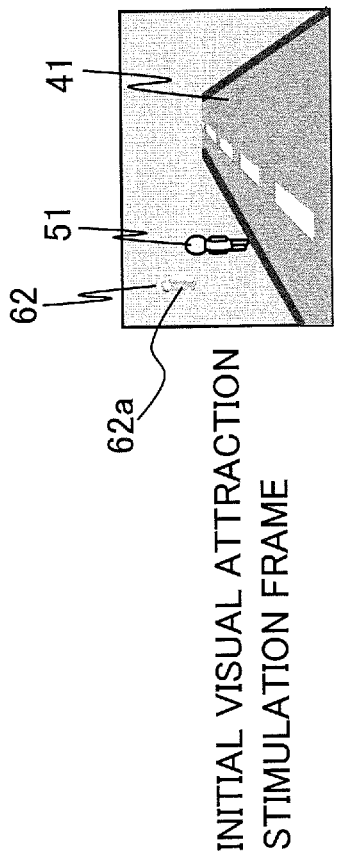

FIG. 14C, FIG. 15C and FIG. 16C show the forward scene and the visual attraction stimulation images 60, 61 and 62 that have reached the target object 51 at a time when T−T0=T1 is satisfied.

Figure 14E:
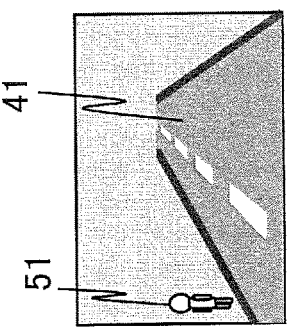
Figure 14D:
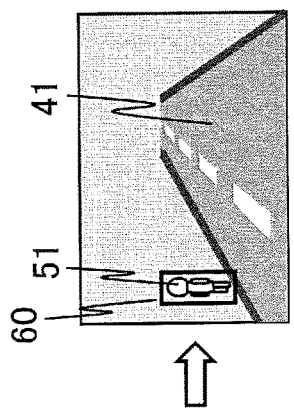
Figure 16D:
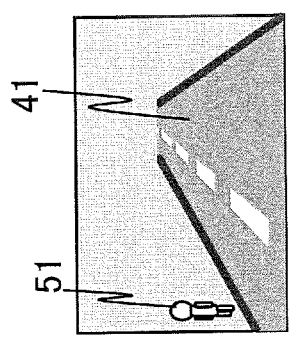

FIG. 14D, FIG. 15D and FIG. 16D show the forward scene and the visual attraction stimulation images 60, 61 and 62 in superimposition on the target object 51 at a time when T1<T−T0<T1+T2 is satisfied.

Figure 16E:
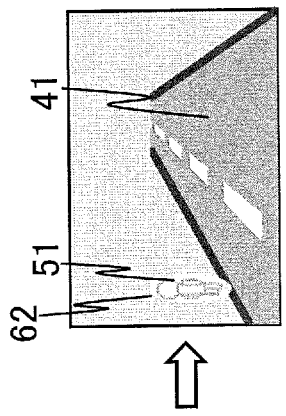

FIG. 14E, FIG. 15E and FIG. 16E show the forward scene at a time when T1+T2≤T−T1 is satisfied. At that time, the visual attraction stimulation images 60, 61 and 62 are not displayed.

FIGS. 14A to 14E show a concrete example of a case where the visual attraction stimulation image 60 is generated as a minimum rectangle containing the target object. At the time point of FIG. 14A when the initial coordinates of the visual attraction stimulation image have been calculated, the visual attraction stimulation image 60 is displayed farther than and further outside than the pedestrian 51. In FIG. 14B, the visual attraction stimulation image 60 is displayed closer to the present position of the pedestrian 51 with the passage of time, and the visual attraction stimulation image 60 is superimposed on the pedestrian 51 at the time point of FIG. 14C when the movement time T1 elapses. From that time point until the superimposition time T2 elapses, the visual attraction stimulation image 60 is displayed as shown in FIG. 14D in superimposition on the pedestrian 51 according to the present position of the pedestrian 51, and the visual attraction stimulation image disappears as shown in FIG. 14E when the superimposition time T2 elapses.

FIGS. 15A to 15E show a concrete example of a case where the visual attraction stimulation image 61 is a figure generated by adjusting the color such as luminance in regard to an image region surrounded by the edge of the target object translated to the coordinates of the visual attraction stimulation image 61. The states at the times in FIGS. 15A to 15E are the same as those in FIGS. 14A to 14E. The example of FIGS. 15A to 15E differs from the example of FIGS. 14A to 14E in that conspicuity of the image existing in the region for displaying the visual attraction stimulation image is increased to be more visually noticeable. Thus, upon reaching the time point of FIG. 15C, the visual attraction stimulation image 61 contains the whole of the pedestrian 51.

FIGS. 16A to 16E show a concrete example of a case where the visual attraction stimulation image 62 is a figure generated by adjusting the color of the target object such as luminance. The states at the times in FIGS. 16A to 16E are the same as those in FIGS. 14A to 14E. In the example of FIGS. 16A to 16E, the visual attraction stimulation image 62 is a stimulus generated based on an image of the pedestrian 51 by performing image processing for increasing the conspicuity, and thus contents as a target object FIG. 62a corresponding to the pedestrian 51 are contained in the visual attraction stimulation image 62 even at the time points of FIGS. 16A and 16B differently from the above-described examples.

Irrespective of the type of the visual attraction stimulation image, each visual attraction stimulation image 60, 61, 63 in FIGS. 14A to 14E, FIGS. 15A to 15E and FIGS. 16A to 16E works as a stimulus that gradually approaches the vehicle 10. Accordingly, risk awareness of the danger of collision of something with the vehicle 10 occurs to the driver 30. Further, for the driver 30, the visual attraction stimulation image is a stimulus that does not approach the vehicle 10 further than the actual target object 50 after the time point of FIG. 14C, FIG. 15C and FIG. 16C, which makes it possible to avoid causing excessive awareness stronger than awareness of danger occurring in the real world.

FIG. 17 is a flowchart showing a process in the body reaction measurement unit 114. In process steps S601 to S604, the body reaction measurement unit 114 extracts the facial expression data, the sight line data, biological data such as the amount of perspiration, the heart rate and the blood pressure value, and the driving action data from various types of data acquired from the body information acquisition unit 109. The order of executing the process steps S601 to S604 is not limited to this order; it is also possible to change the order of executing the process steps S601 to S604 or to execute these process steps in parallel. Further, the body reaction measurement unit 114 may delete unnecessary data that do not fall under the categories of the facial expression data, the sight line data, the biological data and the driving action data. Furthermore, the body reaction measurement unit 114 may additionally acquire data not falling under the categories of the facial expression data, the sight line data, the biological data and the driving action data.

Incidentally, the following explanation will be given of a case where the body information is body data in a plurality of categories and the body data in the plurality of categories include the facial expression data, the sight line data, the biological data and the driving action data.

In process step S605, the body reaction measurement unit 114 calculates the body reaction probability and the body reaction level, as values indicating the body reaction of the driver 30 at the present time point, based on the body data in the plurality of categories obtained as the result of the process steps S601 to S604.

The body reaction probability $P_R$ is, for example, the average value of a plurality of values $(a_i \times P_i)$ each obtained by multiplying the probability $P_i$ of existence of body reaction in each body data, among the body data in the plurality of categories, by a coefficient (i.e., certain value) $a_i$ of the respective body data. Here, i=1, 2, . . . , N. N is an integer indicating the number of categories of the body data. For example, the body reaction probability $P_R$ is obtained according to the following expression 1:

$$P_R = \frac{\sum_{i=1}^{N} (a_i \times P_i)}{N} \quad \text{expression 1}$$

The body reaction level L is, for example, the total value of a plurality of values $(b_i \times P_i)$ each obtained by multiplying a constant $b_i$, given as the body reaction level when there exists body reaction in each body data among the body data in the plurality of categories, by the probability $P_i$ of existence of the corresponding body reaction. For example, to take the driving action data an example, it can be mentioned that the body reaction level constant $b_i$ is higher for a reaction of stepping on the brake pedal of the vehicle 10 than for a reaction of releasing the accelerator pedal of the vehicle 10. Further, it can be mentioned that a body reaction level constant $b_i$ equal to or higher than that for the reaction of stepping on the brake pedal is used for a reaction of turning the steering wheel of the vehicle 10 in a direction for increasing the distance to an obstacle. For example, the body reaction level L is obtained according to the following expression 2:

$$L = \sum_{i=1}^{N} (b_i \times P_i) \quad \text{expression 2}$$

In process step S606, the body reaction measurement unit 114 judges whether there exists body reaction satisfying a certain condition or not based on the body reaction probability and the body reaction level calculated in the process step S605. For example, the body reaction measurement unit 114 advances the process to process step S607 and judges that body reaction to visual stimulation has occurred to the driver at the present time point if the body reaction probability is higher than or equal to a predetermined threshold value (first threshold value), or advances the process to process step S608 and judges that no body reaction has occurred to the driver at the present time point if the body reaction probability is less than the threshold value (first threshold value). However, the judgment on the existence/nonexistence of body reaction satisfying a certain condition may also be made based on the body reaction level, or based on both of the body reaction probability and the body reaction level.

FIG. 18 is a flowchart showing a process in the visual attraction stimulation parameter correction unit 115. In process step S701, the visual attraction stimulation parameter correction unit 115 acquires history records from the visual attraction stimulation history data stored in the memory 103 and advances the process to process step S702.

In the process step S702, the visual attraction stimulation parameter correction unit 115 judges whether or not a visual attraction stimulation image having a possibility of causing body reaction due to visual stimulation to the driver 30 exists in the history records acquired in the process step S701. In this case, each visual attraction stimulation image whose body reaction flag in the target object data is on has already undergone the correction process, and thus is excluded from the judgment process.

The calculation of the possibility of causing body reaction due to visual stimulation is carried out by using an elapsed time since the time point of occurrence of the visual attraction stimulation image to the present time point and a probability distribution indicating the probability of causing body reaction at each elapsed time since the time when the visual attraction stimulation image is presented in a case where the data in the plurality of categories are used.

FIGS. 19A to 19C are explanatory diagrams showing the process of judging a visual attraction stimulation image having a possibility of causing body reaction by using an occurrence probability distribution of body reaction in regard to body data (body information) in each of a first category, a second category and a third category.

In FIGS. 19A to 19C, curves 801, 802 and 803 indicating occurrence probability distributions of body reaction respectively indicate occurrence probability distributions of body reaction in regard to body data in each of the first category, the second category and the third category. In FIGS. 19A to 19C, the horizontal axis represents the elapsed time (seconds) since a presentation start time t0 of the visual attraction stimulation image (e.g., 60) and the vertical axis represents the occurrence probability of body reaction, namely, an occurrence frequency (%) of body reaction, at each time. Further, t1 and t2 respectively represent elapsed times since the presentation start time t0. A visual attraction stimulation image #1 is the visual attraction stimulation image (e.g., 60) at the time point after the elapse of the time t1 since the presentation start time t0 of the visual attraction stimulation image. A visual attraction stimulation image #2 is the visual attraction stimulation image (e.g., 60) at the time point after the elapse of the time t2 since the presentation start time t0 of the visual attraction stimulation image.

In FIGS. 19A to 19C, the occurrence probability of body reaction to the visual attraction stimulation image #1 at the time t1 in body data in each of the first category, the second category and the third category is represented as Pa(t1), Pb(t1) and Pc(t1). The occurrence probability of body reaction to the visual attraction stimulation image #2 at the time t2 in body data in each of the first category, the second category and the third category is represented as Pa(t2), Pb(t2) and Pc(t2).

In the example of FIGS. 19A to 19C, Pa(t1)<Pa(t2), Pb(t1)<Pb(t2), and Pc(t1)<Pc(t2) are satisfied. In the example of FIGS. 19A to 19C, the probabilities Pa(t2), Pb(t2) and Pc(t2) of occurrence of body reaction to the driver 30 due to the visual attraction stimulation image #2 are higher than the probabilities Pa(t1), Pb(t1) and Pc(t1) of occurrence of body reaction of the driver 30 due to the visual attraction stimulation image #1.

For example, the visual attraction stimulation parameter correction unit 115 uses a threshold value Th, judges that the visual attraction stimulation image #1 is not the cause of the body reaction occurring to the driver at the present time point if Pa(t1)+Pb(t1)+Pc(t1)<Th holds, and judges that the visual attraction stimulation image #2 is the cause of the body reaction occurring to the driver at the present time point if Th<Pa(t2)+Pb(t2)+Pc(t2) holds.

The visual attraction stimulation parameter correction unit 115 makes the judgment on the existence/nonexistence of a visual attraction stimulation image that can be regarded as the cause of the body reaction by a method like the above-described method. The visual attraction stimulation parameter correction unit 115 ends the display parameter correction process if no such visual attraction stimulation image exists (NO in S702), or advances the process to process step S703 if such a visual attraction stimulation image exists (YES in S702).

In the process step S703, the visual attraction stimulation parameter correction unit 115 judges whether body reaction exists in the driver at the present time point or not by using the result of the measurement by the body reaction measurement unit 114. The visual attraction stimulation parameter correction unit 115 advances the process to process step S706 if body reaction satisfying a certain condition exists (YES in S703), or advances the process to process step S704 if no body reaction satisfying the certain condition exists (NO in S703).

In the process step S704, in the case where a visual attraction stimulation image having a possibility of causing body reaction exists in the process step S702, the visual attraction stimulation parameter correction unit 115 judges that the intensity of the visual stimulation given to the driver by the visual attraction stimulation image at that time point is inappropriate and it is necessary to raise the intensity of the visual stimulation. Thus, in this process, an object that should be used for the correction of the display parameters is selected from the visual attraction stimulation image judged in the process step S702 to be a visual attraction stimulation image having a possibility of causing body reaction.

As the method of the selection in the process step S704, there is a method using a threshold value in regard to the value of the body reaction probability of the visual attraction stimulation image calculated in the process step S702. This threshold value may be either the same threshold value Th as in the process step S702 or a different threshold value. After completing the process step S704, the visual attraction stimulation parameter correction unit 115 advances the process to process step S705.

In the process step S705, the visual attraction stimulation parameter correction unit 115 adjusts the display parameters of the visual attraction stimulation image so that the driver can easily perceive the visual attraction stimulation image generated subsequently, that is, so that the driver is likely to sense the visual stimulation more intensely. In the case of adjusting the display parameters so that the driver can easily perceive the visual attraction stimulation image, for example, the visual attraction stimulation parameter correction unit 115 adjusts the display parameters so as to raise the conspicuity of the visual attraction stimulation image or increase the size of the visual attraction stimulation image. When adjusting the display parameters so that the driver is more likely to have awareness of the target object, the visual attraction stimulation parameter correction unit 115 increases the moving speed S of the visual attraction stimulation image, decreases the movement time T1, or the like. In the case of adjusting the display parameters so that the driver is more likely to have the awareness of the target object, the visual attraction stimulation parameter correction unit 115 may make the adjustment so as to increase the weight value illustrated in FIG. 10.

Figure 20:
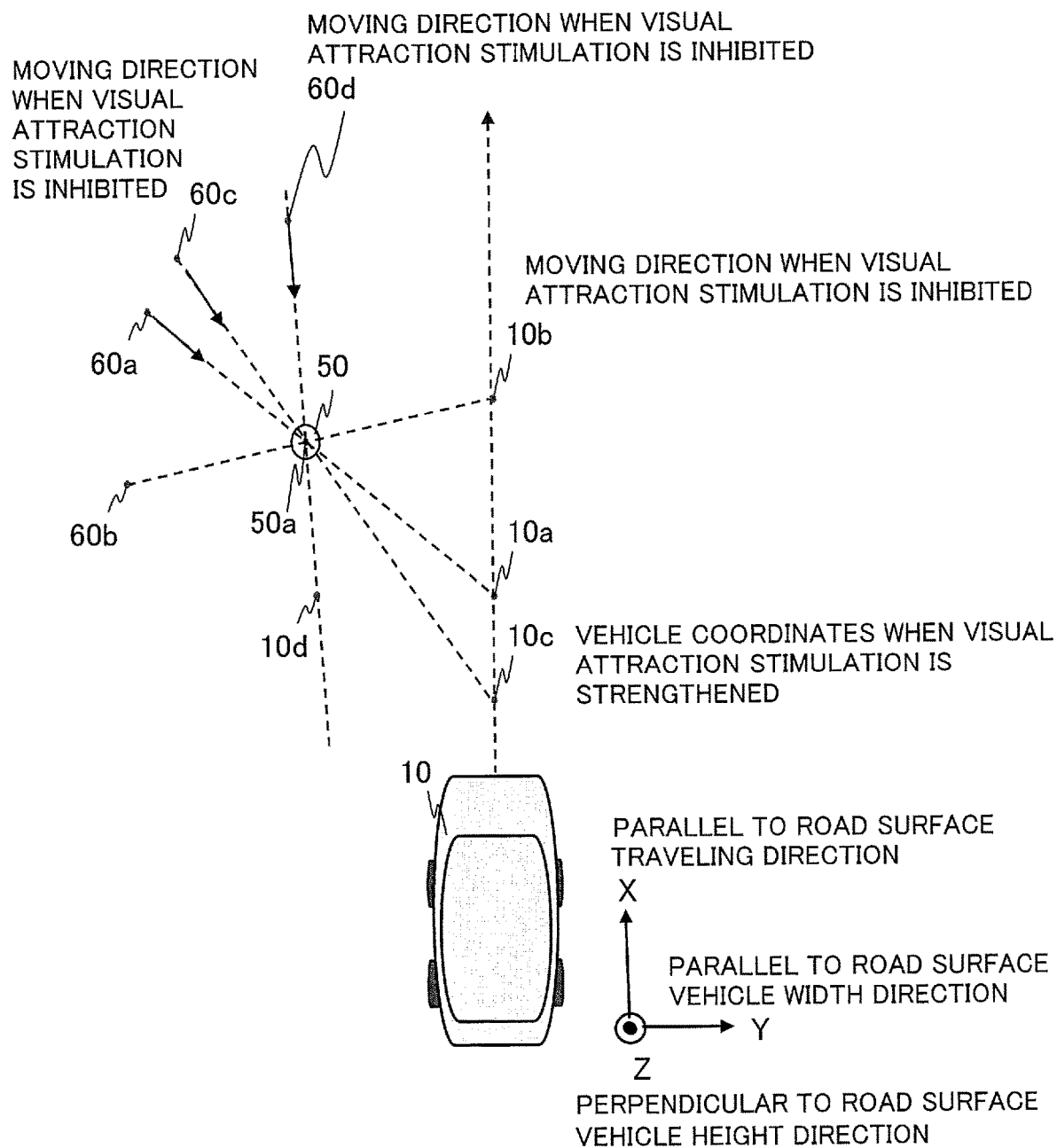
FIG. 20 is an explanatory diagram showing the visual attraction stimulation plan generation process performed by the visual attraction stimulation image generation unit of the driving support device according to the embodiment.

In the case of adjusting the display parameters so that the driver is more likely to have the awareness of the target object, the visual attraction stimulation parameter correction unit 115 may adjust the moving direction of the visual attraction stimulation image. FIG. 20 is a diagram showing an example of the adjustment of the moving direction in regard to the initial coordinates 60a of the visual attraction stimulation image for the target object 50 shown in FIG. 9. In the process step S705, in order to increase the visual stimulation sensed by the driver, the visual attraction stimulation parameter correction unit 115 changes the visual stimulation to visual stimulation in which the visual attraction stimulation image approaches a position closer to the position of the vehicle 10. Specifically, coordinates 10c closer to the vehicle 10 than the position 10a of the vehicle 10 are assumed as the position of the vehicle 10 and the initial coordinates of the visual attraction stimulation image are set at coordinates 60c. By adjusting the initial coordinates of the visual attraction stimulation image as above, the degree of the movement of the visual attraction stimulation image towards the vehicle 10 is strengthened further and an increase in the body reaction level is expected.

After completing the display parameter correction process in the process step S705, the visual attraction stimulation parameter correction unit 115 ends the process.

In the process step S706, the visual attraction stimulation parameter correction unit 115 judges whether or not the driver 30 is receiving excessive visual stimulation from the visual attraction stimulation image, and advances the process to process step S707 if the driver 30 is receiving excessive visual stimulation (YES in S706), or to process step S709 if the driver 30 is not receiving excessive visual stimulation (NO in S706). The visual attraction stimulation parameter correction unit 115 makes the judgment based on how much the body reaction level obtained from the driver at the present time exceeds the body reaction level expected from the visual attraction stimulation image judged in the process step S702, for example. For example, the visual attraction stimulation parameter correction unit 115 judges that the driver is receiving excessive visual stimulation from the visual attraction stimulation image if the body reaction level is higher than or equal to a predetermined threshold value (second threshold value).

In the process step S707, the visual attraction stimulation parameter correction unit 115 performs the same processing as in the process step S704 and thereafter advances the process to process step S708.

In the process step S708, oppositely to the process step S705, for the visual attraction stimulation image to be generated next, the visual attraction stimulation parameter correction unit 115 adjusts the display parameters of the visual attraction stimulation image so that the driver can less easily perceive the visual attraction stimulation image or the driver is less likely to sense the visual stimulation. For example, in the case of adjusting the display parameters of the visual attraction stimulation image so that the driver can less easily perceive the visual attraction stimulation image, the visual attraction stimulation parameter correction unit 115 makes the adjustment of the display parameters so as to lower the conspicuity of the visual attraction stimulation image or decrease the size of the visual attraction stimulation image. In the case of adjusting the display parameters of the visual attraction stimulation image so that the driver is less likely to sense the visual stimulation, the visual attraction stimulation parameter correction unit 115 decreases the moving speed S of the visual attraction stimulation image, increases the movement time T1, or the like. When adjusting the display parameters so that the driver is more likely to have the awareness of the target object, the visual attraction stimulation parameter correction unit 115 may make the adjustment so as to decrease the weight value illustrated in FIG. 10.

Further, the moving direction of the visual attraction stimulation image may be adjusted. FIG. 20 is a diagram showing an example of the adjustment of the moving direction in regard to the initial coordinates 60a of the visual attraction stimulation image for the target object 50 shown in FIG. 9. In the process step S708, in order to make the adjustment so that the visual stimulation by the visual attraction stimulation image is sensed less easily, the visual attraction stimulation parameter correction unit 115 can change the visual stimulation to visual stimulation in which the visual attraction stimulation image approaches a position farther from the position of the vehicle 10. Specifically, the visual attraction stimulation parameter correction unit 115 may employ a method in which coordinates 10b farther from the vehicle 10 than the position 10a of the vehicle 10 are assumed as the vehicle position and the initial coordinates of the visual attraction stimulation image are set at coordinates 60b.

While the above-described method moves the vehicle position in the traveling direction of the vehicle 10, there also is a method that moves the vehicle position in a direction orthogonal to the traveling direction. Specifically, the degree of the movement towards the vehicle can be weakened by assuming the coordinates 10d as the vehicle position and setting the initial coordinates of the visual attraction stimulation image at the coordinates 60d.

By adjusting the initial coordinates of the visual attraction stimulation image as above, the degree of the movement of the visual attraction stimulation image towards the vehicle 10 is weakened and a decrease in the body reaction level is expected.

After the process step S708, that is, after completing the correction of the display parameters, the visual attraction stimulation parameter correction unit 115 advances the process to the process step S709. In the process step S709, the visual attraction stimulation parameter correction unit 115 sets the body reaction flag to on in the data of the target object corresponding to the visual attraction stimulation image judged in the process step S702, and ends the process.

FIGS. 21A to 21E show display examples of the visual attraction stimulation image 63 when the forward image shown in FIG. 13 is acquired. FIGS. 21A to 21E show an example in which a more enhanced visual attraction stimulation image 63 is displayed by correcting the display parameters of the visual attraction stimulation image by the process step S705 of the visual attraction stimulation parameter correction unit 115 after presenting the visual attraction stimulation image 60 shown in FIGS. 14A to 14E.

The example of FIGS. 21A to 21E is a presentation example in a case where the thickness of the frame is increased in order to raise the conspicuity of the visual attraction stimulation image 63 and the moving speed S of the visual attraction stimulation image 63 is increased in order to increase the body reaction level.

Figure 21A:
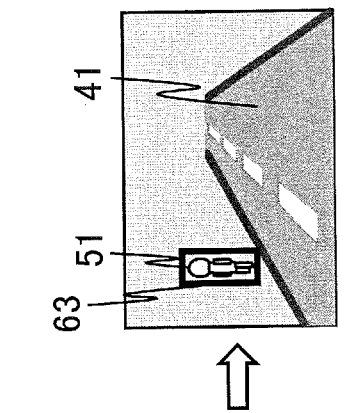
FIGS. 21A to 21E are diagrams showing another example of the visual attraction stimulation image displayed by the driving support device according to the embodiment.

As shown in FIG. 21A, the visual attraction stimulation image 63 presented in the initial visual attraction stimulation frame is displayed at a position farther than the visual attraction stimulation image 60 presented in the initial visual attraction stimulation frame in FIG. 14A.

Figure 21B:
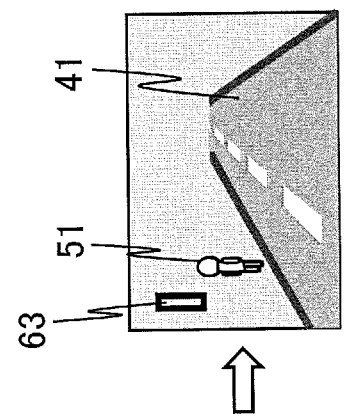

Further, as shown in FIG. 21B, the visual attraction stimulation image 63 presented in the visual attraction stimulation frame is displayed at a position farther than the visual attraction stimulation image 60 presented in the visual attraction stimulation frame in FIG. 14B.

Figure 21C:
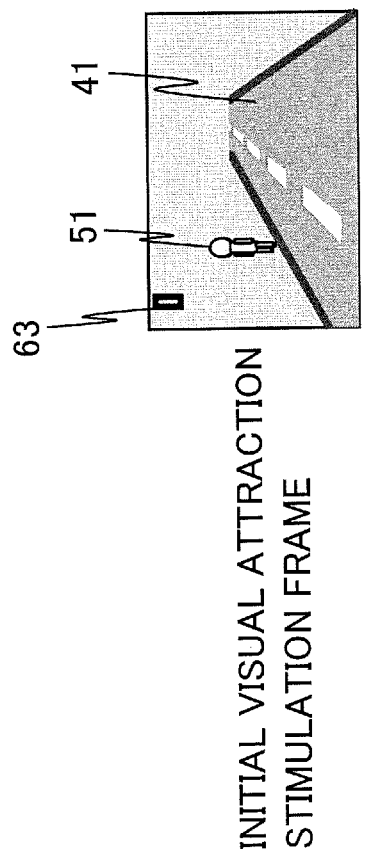
Figure 21D:
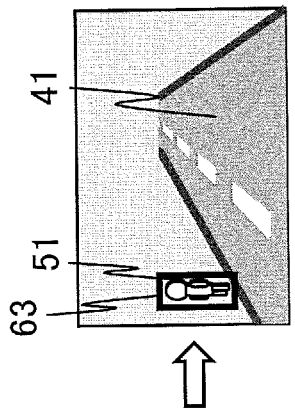
Figure 21E:
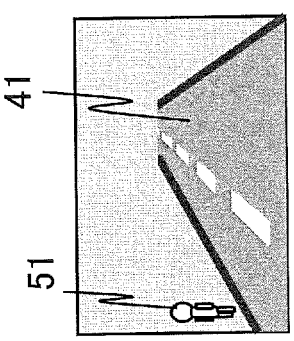

At the time point when T−T0=T1 holds, the visual attraction stimulation image 63 is superimposed on the target object 50 as shown in FIG. 21C and the visual attraction stimulation image 60 is superimposed on the target object 50 as shown in FIG. 14C. Specifically, in the case of FIGS. 21A to 21C, the visual attraction stimulation image 63 is moved from a farther position, and thus the moving speed of the visual attraction stimulation image 63 becomes faster and the visual stimulation approaches the vehicle 10 faster for the driver, from which an increase in the body reaction level can be expected.

Incidentally, when the display parameters of the visual attraction stimulation image 63 are corrected to inhibit the visual stimulation by the process step S708 of the visual attraction stimulation parameter correction unit 115 after presenting the visual attraction stimulation image 63 shown in FIGS. 21A to 21E, the visual attraction stimulation image 60 shown in FIGS. 14A to 14E may be presented.

FIGS. 22A to 22E show an example of a case where the display parameters are corrected so as to inhibit the visual stimulation of a visual attraction stimulation image 64 by the process step S708 of the visual attraction stimulation parameter correction unit 115 after presenting the visual attraction stimulation image 60 shown in FIGS. 14A to 14E.

The example of FIGS. 22A to 22E is an example in which the moving direction of the visual attraction stimulation image 64 is adjusted to deviate from the direction heading towards the vehicle 10 in order to make the adjustment in the direction of lowering the body reaction level. As a concrete example of the adjustment, a case where the initial coordinates of the visual attraction stimulation image shown in FIG. 20 are set at coordinates 60d is assumed.

Comparing FIGS. 22A to 22C with FIGS. 14A to 14C, the visual attraction stimulation image 64 in FIGS. 22A to 22C in the initial visual attraction stimulation frame, the visual attraction stimulation frame of T−T0<T1 and the visual attraction stimulation frame of T−T0=T1 is presented so that the degree of moving towards the vehicle 10 is weak compared to the visual attraction stimulation image 60 in FIGS. 14A to 14C. In other words, the moving direction of the visual attraction stimulation image 60 in FIGS. 14A to 14C is a direction of approaching the vehicle 10 while moving in a direction crossing the road, whereas the moving direction of the visual attraction stimulation image 64 in FIGS. 22A to 22C is a direction of approaching the vehicle 10 while moving along the road.

Incidentally, when the display parameters of the visual attraction stimulation image 64 are corrected to strengthen the visual stimulation by the process step S705 of the visual attraction stimulation parameter correction unit 115 after presenting the visual attraction stimulation image 64 shown in FIGS. 22A to 22E, the visual attraction stimulation image 60 shown in FIGS. 14A to 14E may be presented.

(3) Effect

With the driving support device 100 according to this embodiment, the line of sight of the driver 30 of the vehicle 10 can be guided to the target object 50 (e.g., pedestrian 51) by use of the visual attraction stimulation image 60-64.

Further, with the driving support device 100 according to this embodiment, the driver 30 is enabled to have the awareness of the danger of collision in a simulation-like manner thanks to the visual attraction stimulation image 60-64 moving towards the target object 50 from a position farther than the target object 50, that is, the visual attraction stimulation image 60-64 approaching the vehicle 10. Accordingly, it is possible to prevent the decrease in the consciousness of the driver 30 trying to perceive the target object with the driver's own attentiveness. In other words, with the driving support device 100 according to this embodiment, the driver 30 driving the vehicle 10 experiences the approach of the target object in a simulation-like manner thanks to the visual attraction stimulation image 60-64, which makes the driver 30 have consciousness of autonomously preventing a decrease in the attentiveness.

Furthermore, with the driving support device 100 according to this embodiment, the movement time T1 until showing the enhanced display of the target object is set, which makes it possible to prevent the driver 30 from having excessive risk awareness due to intense visual stimulation.

Moreover, with the driving support device 100 according to this embodiment, the superimposition time T2 for which the visual attraction stimulation image 60-64 is displayed in superimposition on the target object is set, and thus the visual attraction stimulation image 60-64 disappears at or just after the moment when the driver 30 actually responds to the visual attraction stimulation image 60-64 and moves the line of sight. Accordingly, the driver 30 just after moving the line of sight mainly views the target object 50 alone, which also brings an advantage of not giving a feeling of strangeness to the driver 30.

In addition, with the driving support device 100 according to this embodiment, intensity of the visual attraction stimulation image 60-64 can be adjusted depending on the intensity of the visual stimulation sensed by the driver. Consequently, an advantage is obtained in that appropriate visual stimulation can be provided to the driver.

DESCRIPTION OF REFERENCE CHARACTERS

10: vehicle, 22: windshield, 30: driver, 40: road, 41: roadway, 50: target object, 51: pedestrian (target object), 60-64: visual attraction stimulation image, 100: driving support device, 101: control unit, 102: processor, 103: memory, 104: image processing processor, 105: camera (vicinity detection unit), 106: viewpoint sensor, 107: display device, 108: biological sensor, 109: body information acquisition unit, 110: CAN interface, 111: target object judgment unit, 112: visual attraction stimulation image generation unit, 113: display control unit, 114: body reaction measurement unit, 115: visual attraction stimulation parameter correction unit, 116: correction unit.

What is claimed is:

1. A driving support device for supporting driving performed by a driver of a vehicle, comprising:
   processing circuitry
      to judge a target object that is a real object existing in a vicinity of the vehicle and should be paid attention to by the driver based on vicinity information acquired by a vicinity detector that captures an image of or detects a real object existing in the vicinity of the vehicle;
      to generate a visual attraction stimulation image that appears to move from a position farther than the target object towards a position where the target object exists;
      to cause a display device that displays an image in superimposition on the real object to display the visual attraction stimulation image; and
      to receive body information from a body information detector acquiring the body information on the driver, to calculate a value indicating body reaction to visual stimulation sensed by the driver from the body information, and to correct a display parameter that determines display condition of the visual attraction stimulation image based on the value indicating the body reaction so as to change a degree of the visual stimulation given to the driver by the visual attraction stimulation image,
   wherein the value indicating the body reaction includes at least one of a body reaction probability indicating a probability of existence of the body reaction and a body reaction level indicating a level of the body reaction.

2. The driving support device according to claim 1, wherein the processing circuitry starts the movement of the visual attraction stimulation image at the position farther than the target object and ends the movement of the visual attraction stimulation image at the position where the target object exists.

3. The driving support device according to claim 1, wherein the processing circuitry corrects the display parameter so as to reduce the visual stimulation given to the driver by the visual attraction stimulation image when the value indicating the body reaction is greater than or equal to a predetermined first threshold value.

4. The driving support device according to claim 1, wherein the processing circuitry corrects the display parameter so as to strengthen the visual stimulation given to the driver by the visual attraction stimulation image when the value indicating the body reaction is less than a predetermined second threshold value.

5. The driving support device according to claim 1, wherein the processing circuitry does not correct the display parameter when the value indicating the body reaction is less than a predetermined second threshold value.

6. The driving support device according to claim 1, wherein the processing circuitry includes a body reaction measurer that calculates the value indicating the body reaction based on a result of measuring a change in one or more of facial expression, muscle tonus, a flexor reflex, a heart rate, a blood pressure value, a line of sight and driving action of the driver.

7. The driving support device according to claim 1, wherein the processing circuitry determines a visual attraction stimulation image from which the driver sensed visual stimulation by using an elapsed time from a time point when the visual attraction stimulation image is presented to appearance of a change in the body information on the driver and corrects the display parameter of the visual attraction stimulation image.

8. The driving support device according to claim 1, wherein the processing circuitry
determines a weight value corresponding to a viewpoint vector of the driver based on the viewpoint vector at a time when the visual attraction stimulation image is presented, and
uses the weight value in the correction of the display parameter.

9. The driving support device according to claim 1, wherein the processing circuitry performs adjustment of the display parameter by using one or more of a moving speed of the visual attraction stimulation image, a moving distance of the visual attraction stimulation image, a moving direction of the visual attraction stimulation image, and a weight value based on a viewpoint vector.

10. The driving support device according to claim 1, wherein
when strengthening the visual stimulation given by the visual attraction stimulation image, the processing circuitry performs one or more of increasing a moving speed of the visual attraction stimulation image, increasing a moving distance of the visual attraction stimulation image, and making a moving direction of the visual attraction stimulation image closer to a direction heading towards the vehicle, and
when inhibiting the visual stimulation given by the visual attraction stimulation image, the processing circuitry performs one or more of decreasing the moving speed of the visual attraction stimulation image, decreasing the moving distance of the visual attraction stimulation image, and making the moving direction of the visual attraction stimulation image closer to a direction heading towards a position separate from the vehicle.

11. A driving support method of supporting driving performed by a driver of a vehicle, comprising:
judging a target object that is a real object existing in a vicinity of the vehicle and should be paid attention to by the driver based on vicinity information acquired by a vicinity detector that captures an image of or detects a real object existing in the vicinity of the vehicle;
generating a visual attraction stimulation image that appears to move from a position farther than the target object towards a position where the target object exists;
causing a display device that displays an image in superimposition on the real object to display the visual attraction stimulation image; and
receiving body information from a body information detector that acquires the body information on the driver, calculating a value indicating body reaction to visual stimulation sensed by the driver from the body information, and correcting a display parameter that determines display condition of the visual attraction stimulation image based on the value indicating the body reaction so as to change a degree of the visual stimulation given to the driver by the visual attraction stimulation image,
wherein the value indicating the body reaction includes at least one of a body reaction probability indicating a probability of existence of the body reaction and a body reaction level indicating a level of the body reaction.

12. A non-transitory computer-readable storage medium storing a driving support program for supporting driving performed by a driver of a vehicle, wherein the driving support program causes a computer to execute processing comprising:
judging a target object that is a real object existing in a vicinity of the vehicle and should be paid attention to by the driver based on vicinity information acquired by a vicinity detector that captures an image of or detects a real object existing in the vicinity of the vehicle;
generating a visual attraction stimulation image that appears to move from a position farther than the target object towards a position where the target object exists;
causing a display device that displays an image in superimposition on the real object to display the visual attraction stimulation image; and
receiving body information from a body information detector that acquires the body information on the driver, calculating a value indicating body reaction to visual stimulation sensed by the driver from the body information, and correcting a display parameter that determines display condition of the visual attraction stimulation image based on the value indicating the body reaction so as to change a degree of the visual stimulation given to the driver by the visual attraction stimulation image,
wherein the value indicating the body reaction includes at least one of a body reaction probability indicating a probability of existence of the body reaction and a body reaction level indicating a level of the body reaction.

* * * * *